(12) United States Patent
Stokes et al.

(10) Patent No.: US 12,155,773 B2
(45) Date of Patent: Nov. 26, 2024

(54) SYSTEMS AND METHODS FOR ON-DEMAND VALIDATION OF DISTRIBUTED LEDGER RECORDS

(71) Applicant: Verizon Patent and Licensing Inc., Basking Ridge, NJ (US)

(72) Inventors: John M. Stokes, Yorba Linda, CA (US); Muhammad Salman Nomani, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 195 days.

(21) Appl. No.: 18/060,655

(22) Filed: Dec. 1, 2022

(65) Prior Publication Data

US 2024/0187245 A1    Jun. 6, 2024

(51) Int. Cl.
*H04L 29/06* (2006.01)
*G06Q 20/38* (2012.01)
*H04L 9/32* (2006.01)

(52) U.S. Cl.
CPC ....... *H04L 9/3242* (2013.01); *G06Q 20/3823* (2013.01)

(58) Field of Classification Search
CPC .................................................. H04L 9/3242
See application file for complete search history.

(56) References Cited

U.S. PATENT DOCUMENTS

| | | | | |
|---|---|---|---|---|
| 2019/0014176 A1* | 1/2019 | Tormasov | ............. | H04L 63/123 |
| 2020/0328892 A1* | 10/2020 | Gangal | ................. | H04L 9/0825 |
| 2023/0421570 A1* | 12/2023 | Gould | .................. | H04L 63/123 |

OTHER PUBLICATIONS

Yongge Wang, "Byzantine Fault Tolerance in Partial Synchronous Networks," Cryptology ePrint Archive 2019/1460 (2020), available at https://eprint.iacr.org/2019/1460.pdf.
Leach et al., "A Universally Unique IDentifier (UUID) URN Namespace," Network Working Group Request for Comments 4122 (2005), available at https://www.rfc-editor.org/rfc/pdfrfc/rfc4122.txt.pdf.
Momose et al., "Hybrid-BFT: Optimistically Responsive Synchronous Consensus with Optimal Latency or Resilience," Cryptology ePrint Archive 2020/0406 (2020), available at https://eprint.iacr.org/2020/406.pdf.
Ittai Abraham, "Synchrony, Asynchrony and Partial Synchrony" (2019), available at https://decentralizedthoughts.github.io/2019-06-01-2019-5-31-models/.
Wikipedia, "Byzantine Fault" (latest edit Nov. 12, 2022), available at https://en.wikipedia.org/wiki/Byzantine_fault.

* cited by examiner

*Primary Examiner* — Jason K Gee

(57) ABSTRACT

A device described herein may maintain a distributed ledger that is also maintained by at least one other device. The device may receive a record for recordation to the distributed ledger, and may add the record to the distributed ledger without communicating with the at least one other device to validate (e.g., cross-validate) the record. The device may receive a request for information included in the record and, after receiving the request for the information included in the record, communicate with one or more devices, of the at least one other device, to validate the record. The device may determine, based on communicating with the one or more devices, that the record is valid; and may output, in response to the request and based on determining that the record is valid, the requested information included in the record.

20 Claims, 20 Drawing Sheets

SYSTEMS AND METHODS FOR ON-DEMAND VALIDATION OF DISTRIBUTED LEDGER RECORDS

BACKGROUND

Distributed ledgers, such as blockchains, provide for the decentralized and secure storage of data. Distributed ledgers may further provide for the immutability of recorded data, as data may not be altered once recorded to a distributed ledger. Distributed ledgers may utilize mechanisms such as cross-validation to verify that local copies of the distributed ledger, as maintained by individual nodes, match the local copies of the distributed ledger maintained by some or all of the other nodes that maintain the distributed ledger.

DETAILED DESCRIPTION OF EXAMPLE EMBODIMENTS

Figure 1:
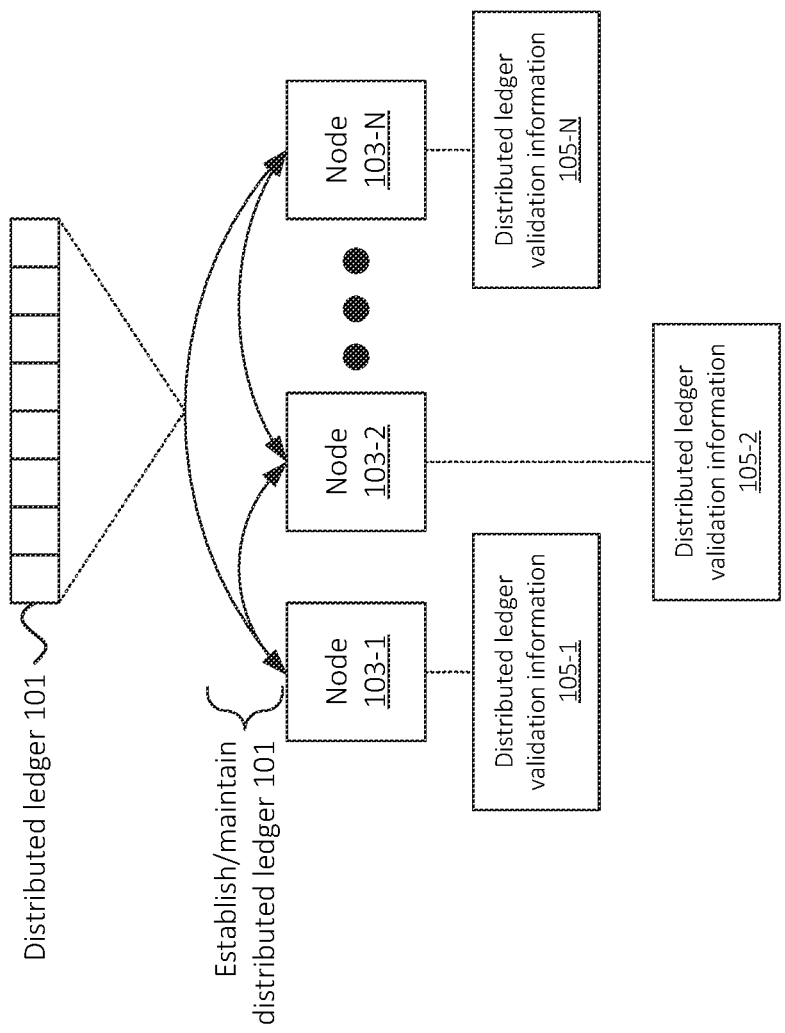
FIG. 1 illustrates an example of a distributed ledger and respective validation information that may be stored by a set of nodes, in accordance with some embodiments.

The following detailed description refers to the accompanying drawings. The same reference numbers in different drawings may identify the same or similar elements.

Distributed ledgers, such as blockchains, may provide for a decentralized, immutable mechanism by which data may be recorded and/or retrieved. A given distributed ledger, such as distributed ledger 101 shown in FIG. 1, may be established and/or maintained by two or more nodes (e.g., nodes 103-1 through 103-N, where N is greater than 1), which may each be implemented by distinct sets of hardware resources that may be associated with different, independent entities. Each node 103 associated with distributed ledger 101 may maintain a local copy of distributed ledger 101. Distributed ledger 101 may be "distributed" inasmuch as the local copy maintained by each node 103 matches the local copy maintained by the other nodes 103 (e.g., by at least a threshold proportion, quorum, "consensus," etc. of the other nodes) associated with distributed ledger 101. Thus, while each node 103 independently maintains distributed ledger 101, a local copy of distributed ledger 101 obtained from a particular node 103 may be representative of distributed ledger 101 as maintained by the other nodes.

In order to verify that a local copy of distributed ledger 101, and/or portions thereof (e.g., blocks, records, and/or other discrete portions of distributed ledger 101) matches the local copies of distributed ledger 101 maintained by some or all of the other nodes 103, some or all nodes 103 may perform a cross-validation procedure. The cross-validation procedure, as performed or initiated by a particular node 103, may include communicating with one or more other nodes 103 to verify that the local copy of distributed ledger 101 (and/or one or more portions thereof), as maintained by the particular node 103 matches the local copy of distributed ledger 101 maintained by the one or more other nodes 103. Such verification may include, for example, performing a cryptographic hashing operation or other suitable operation using the entire distributed ledger 101 and/or portions thereof (e.g., individual blocks, sets of blocks, etc.) as input to the cryptographic hashing operation. Such operation may be referred to as "computing a hash," "generating a hash," or other suitable terminology with respect to distributed ledger 101 and/or portions thereof. Each node 103, as part of the cross-validation procedure, may compute a hash of distributed ledger 101 or portions thereof, and request that one or more other nodes 103 compute and provide the hash of distributed ledger 101 or the portions thereof. The particular node 103 may identify that distributed ledger 101 (or portions thereof) have been cross-validated once receiving the same hash value from at least a threshold quantity, proportion, quorum, consensus, etc. of other nodes 103.

In some scenarios, each time information is added to distributed ledger 101 (e.g., in the form of blocks, records, etc.), each node 103 may initiate a cross-validation procedure, which may involve communicating with multiple other nodes 103. However, situations may occur in which, after the cross-validation, some or all nodes 103 never actually access or otherwise use the block that has been added and cross-validated. In accordance with embodiments described herein, nodes 103 may add blocks to distributed ledger 101 (e.g., as proposed by one or more other nodes 103, such as nodes that have authority to add blocks to distributed ledger 101), and may perform an "on-demand" or "delayed" cross-validation of the blocks. For example, as discussed below, in situations where a particular node 103 receives a request for information contained in a particular block, the particular node 103 may initiate a cross-validation procedure after receiving the request. In this manner, the particular node 103 may provide the requested information along with confirmation that the requested information has been cross validated by nodes 103, without the need for potentially large amounts of excess messaging between nodes 103 that may otherwise occur if each node 103 performs a cross-validation procedure each time information is recorded to distributed ledger 101.

In accordance with some embodiments, as shown in FIG. 1, each node 103-1 may maintain, along with its respective local copy of distributed ledger 101, respective distributed ledger validation information 105. For example, node 103-1 may maintain distributed ledger validation information 105-1, node 103-2 may maintain distributed ledger validation information 105-2, and so on. Nodes 103 may update their respective distributed ledger validation information 105 when receiving new blocks for recordation, committing, etc. to distributed ledger 101 and/or when cross-validating blocks that have been recorded, committed, etc. to distributed ledger 101.

Figure 2:
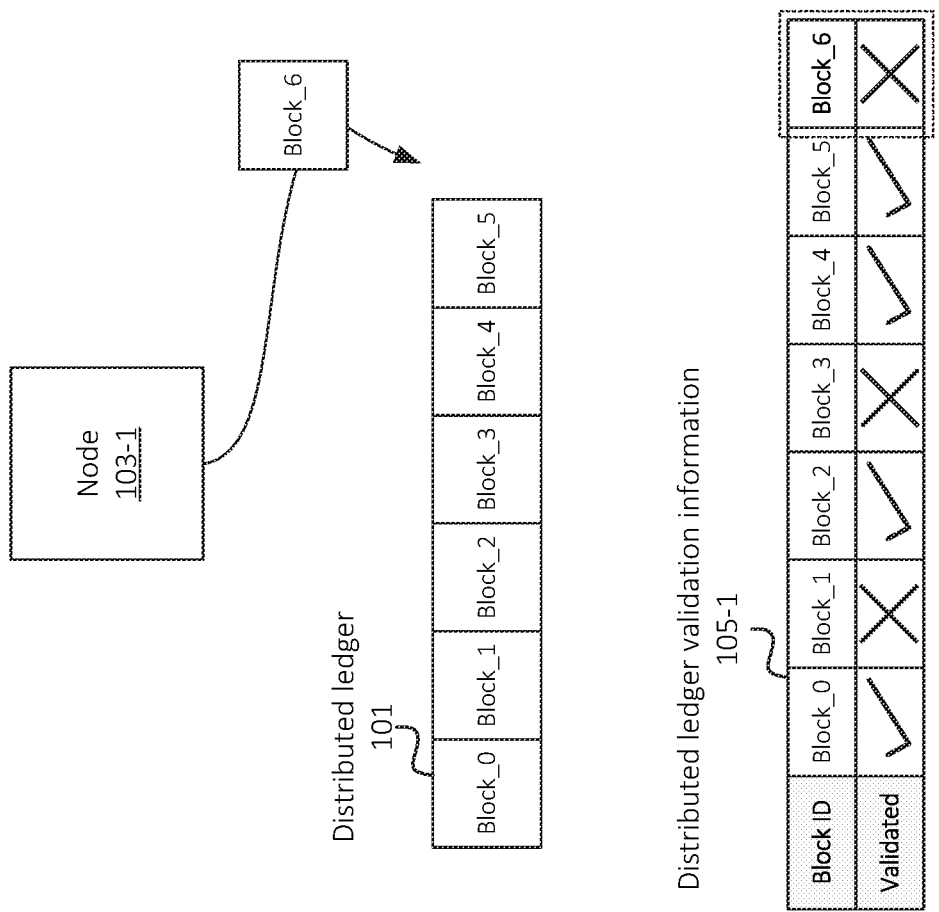
FIG. 2 illustrates an example of updating validation information associated with a particular node based on receipt of a block added to a distributed ledger, in accordance with some embodiments.

For example, as shown in FIG. 2, assume that distributed ledger 101 includes Block_0 through Block_5. Accordingly, a particular node 103-1 may maintain a local copy of distributed ledger 101, where the local copy of distributed ledger 101 includes Block_0 through Block_5. Node 103-1 may have verified, confirmed, etc. each block when the blocks were added to distributed ledger 101. For example, node 103-1 may have confirmed that the blocks were proposed and/or otherwise received from an authorized source (e.g., where one or more particular nodes 103 may be authorized, randomly selected, selected via consensus mechanisms, etc. to record information to distributed ledger 101). Additionally, or alternatively, node 103-1 may have confirmed that each block included or referenced a hash or other identifier, value, etc. of distributed ledger 101 and/or a portion thereof. For example, when receiving Block_4, node 103-1 may have confirmed that Block_4 included a hash of distributed ledger 101 including Block_0 through Block_3, that Block_4 included a hash of Block_3 or a portion thereof (e.g., a hash of a header of Block_3), and/or may have otherwise verified that Block_4 should be added to distributed ledger 101.

In accordance with some embodiments, when recording blocks to distributed ledger 101, nodes 103 (e.g., node 103-1) may forgo cross-validating the blocks. For example, when receiving Block_6 for recordation to distributed ledger 101, node 103-1 may do so without cross-validating Block_6 (e.g., without communicating with other nodes 103 to confirm that Block_6 should be added to distributed ledger 101, such as by requesting hashes performed by other nodes 103 on Block_6 and/or other portions of distributed ledger 101 and comparing such hashes with a hash computed by node 103-1).

As further shown, distributed ledger validation information 105-1, as maintained by node 103-1, may be updated to include information for Block_6 (e.g., which may refer to Block_6 by a block identifier of Block_6, a hash of Block_6 or a portion thereof, and/or some other suitable identifier). Adding the information for Block_6 may include adding an indication (denoted by an "X" in the figure) that Block_6 has not been cross-validated by node 103-1, even though Block_6 has been added to the local copy of distributed ledger 101 maintained by node 103-1. As shown in this example, distributed ledger validation information 105-1 may also include information indicating that Block_1 and Block_3 have not been cross-validated by node 103-1. On the other hand, distributed ledger validation information 105-1 may include indications (denoted by check marks in the figure) that Block_0, Block_2, Block_4, and Block_5 have previously been cross-validated by node 103-1.

Figure 3:
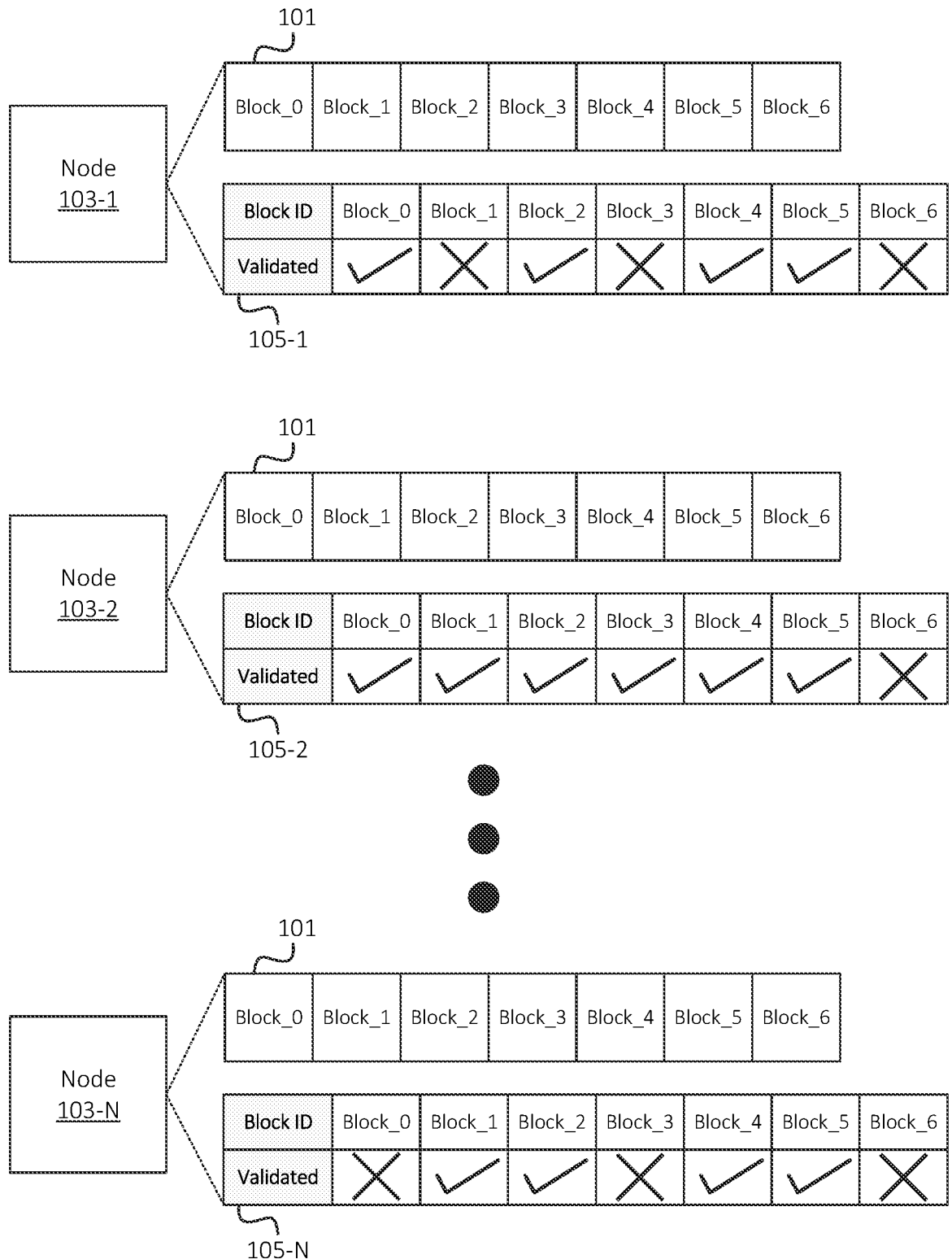
FIG. 3 illustrates examples of instances of validation information that may be concurrently maintained by different nodes associated with a distributed ledger, in accordance with some embodiments.

As noted above, distributed ledger validation information 105 may be different for different nodes 103, as different nodes 103 may have cross-validated (or not cross-validated) different blocks. For example, at a given point in time, as shown in FIG. 3, distributed ledger validation information 105-1 may indicate that a first set of blocks (e.g., Block_0, Block_2, Block_4, and Block_5) have been cross-validated by node 103-1, distributed ledger validation information 105-2 may indicate that a different second set of blocks have been cross-validated by node 103-2, and so on.

Figure 4A:
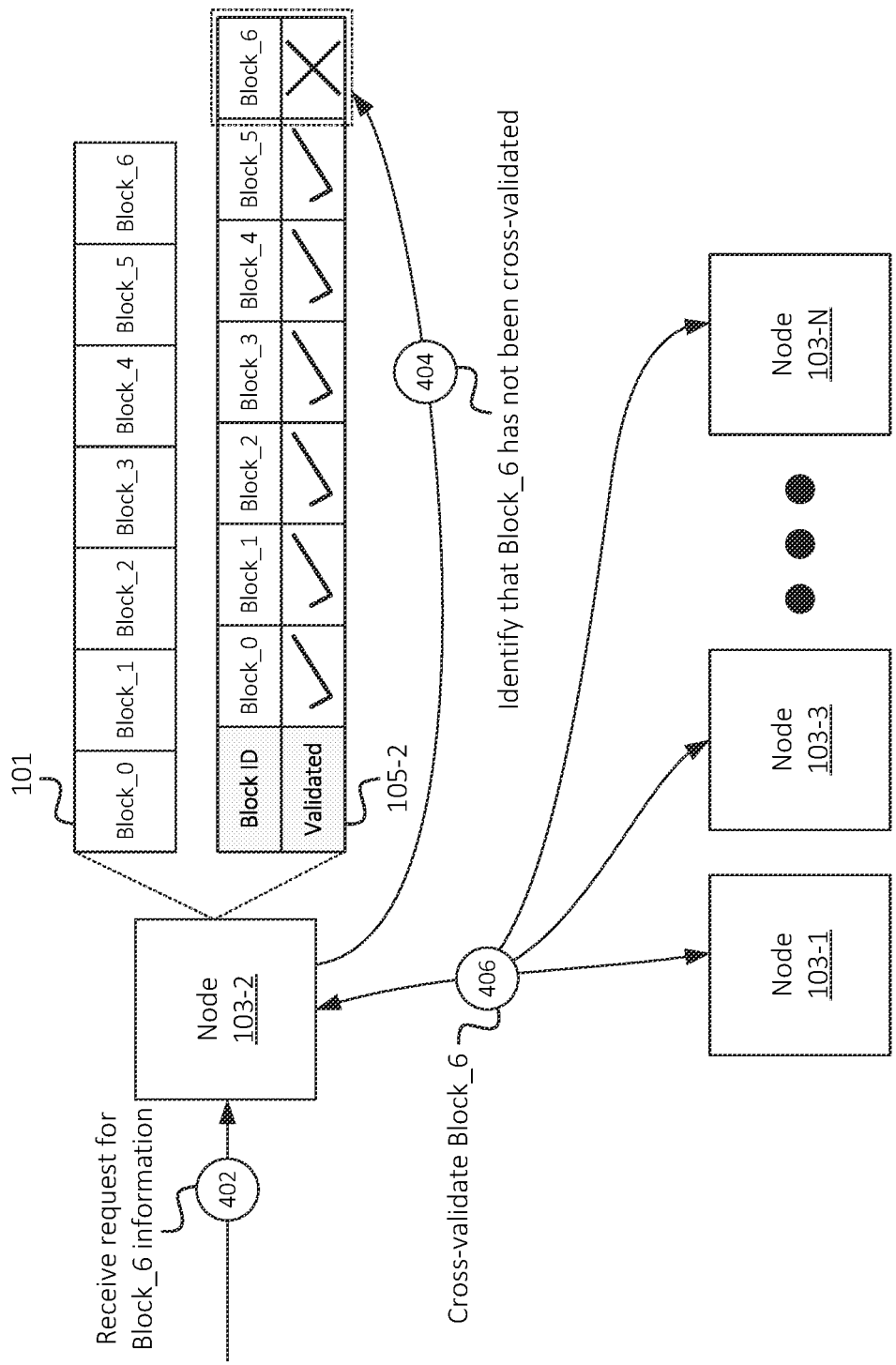
FIGS. 4A and 4B illustrate an example of performing an on-demand cross-validation of a record added to a distributed ledger when information associated with the record is requested, in accordance with some embodiments.
Figure 4B:
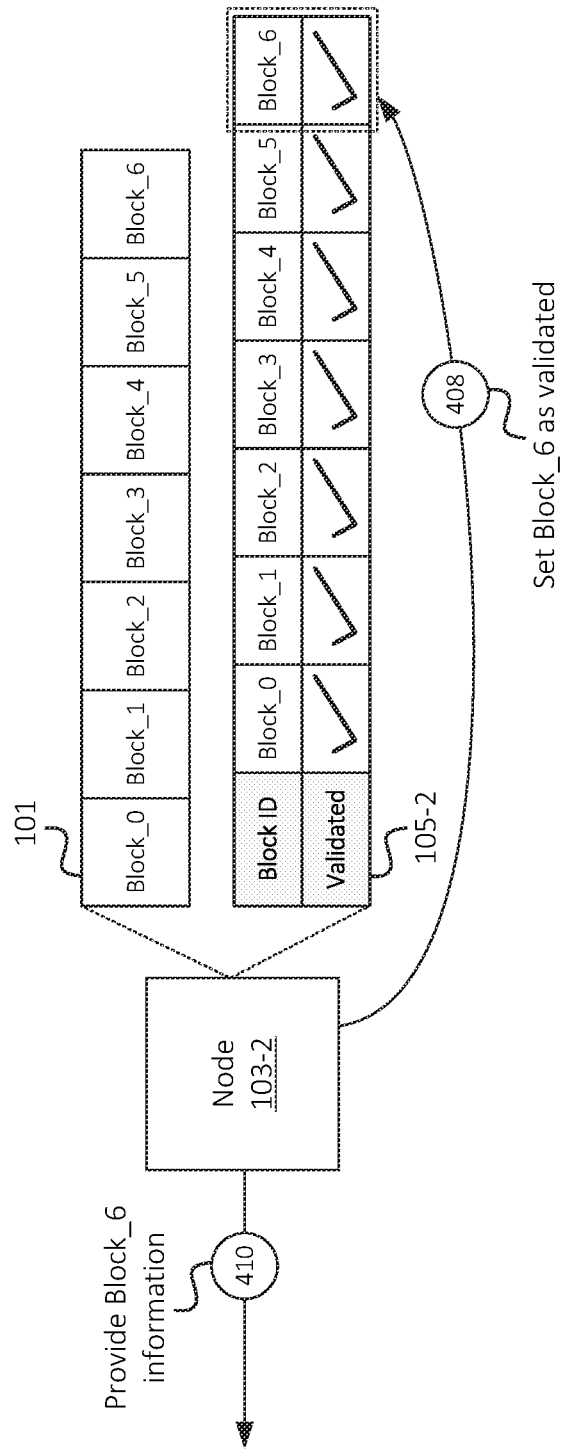

FIGS. 4A and 4B illustrate an example scenario, in accordance with some embodiments, in which a particular node 103 (i.e., node 103-2, in this example) may cross-validate a particular block (i.e., Block_6 in this example) that has been previously received and recorded, committed, etc. to distributed ledger 101 (e.g., committed to distributed ledger 101 without a cross-validation procedure). As shown in FIG. 4A, node 103-2 may receive (at 402) a request for Block_6 information, such as a request for a payload of Block_6. For example, each block of distributed ledger 101 may include header information and payload information, where header information may include information that may be used to structure distributed ledger 101, sequence or order the blocks of distributed ledger 101, indicate provenance and/or integrity information associated with each block, etc. The payload of a block may include information that has been provided for recordation to distributed ledger 101, such as a smart contract, a non-fungible token ("NFT"), transaction or interaction information (e.g., indicating a swapping, minting, burning, etc. of an asset represented by information recorded to distributed ledger 101, or other types of transaction or interaction information), and/or other suitable information.

The request may be received (at 402) via an application programming interface ("API") implemented by node 103-2, may be received from a decentralized Application ("dApp"), and/or via some other suitable communication pathway. In some embodiments, node 103-2 may be communicatively coupled to a messaging application implemented at a particular User Equipment ("UE"), such as a mobile phone, a tablet, a wearable device, or some other wireless communication device. For example, node 103-2 may be implemented by the same UE or may otherwise be communicatively coupled to the UE (e.g., via a network). In some embodiments, as discussed below, distributed ledger 101 may maintain keys or other information that may be used to decrypt encrypted messages sent or received by the messaging application, and the messaging application may request (e.g., from node 103-2) one or more keys maintained in distributed ledger 101.

In some embodiments, the request (at 402) may include an identifier or reference to a particular block. For example, the request may include an identifier of a particular block, a sequence number of the particular block, and/or other information relating to the structure of distributed ledger 101.

Additionally, or alternatively, the request may include search terms or other information that may be used by node 103-2 to identify the block, such as a messaging communication session identifier, a user name, an identifier of another UE with which a messaging communication session is active, or other suitable information. Node 103-2 may, for example, search for such search terms in header and/or payload information of blocks recorded to distributed ledger 101 in order to identify a particular block from which information is being requested.

Based on receiving (at 402) the request for Block_6 information, node 103-2 may check distributed ledger validation information 105-2, as maintained by node 103-2, to determine whether Block_6 has been cross-validated. In this example, node 103-2 may identify (at 404) that the requested Block_6 has not previously been cross-validated. In other words, node 103-2 may not have previously determined that Block_6 has been validated, confirmed, verified, etc. by at least a threshold quantity, proportion, quorum, consensus, etc. of other nodes 103. Accordingly, based on the request (at 402) for Block_6 information as well as the determination (at 404) that Block_6 has not been cross-validated, node 103-2 may initiate (at 406) a cross-validation procedure for Block_6. As noted above, the cross-validation of Block_6 may include communicating with some or all other nodes 103 with which distributed ledger 101 is associated in order to verify that Block_6, as maintained in the local copy of distributed ledger 101 maintained by node 103-2, matches Block_6 as maintained by some or all other nodes 103.

In this example, assume that via the cross-validation procedure (at 406), node 103-2 determines that Block_6 is cross-validated. Accordingly, as shown in FIG. 4B, node 103-2 may mark Block_6 as validated in distributed ledger validation information 105-2, and may provide (at 410) the requested information associated with Block_6. In some embodiments, node 103-2 may also provide (at 410) an indication that the requested information has been cross-validated.

In situations where a given node 103 is unable to cross-validate a given block for which information is requested (e.g., if node 103-2 had determined, based on the cross-validation procedure (at 406) that Block_6 has not been verified by at least a threshold quantity or proportion of nodes 103), node 103 may output, in response to the request, an indication that the requested information is unavailable. Additionally, or alternatively, the given node 103 may output the information from the local copy of distributed ledger 101 maintained by node 103, but may also include a warning, alert, indication, etc. that the information has not been cross-validated, and other nodes 103 may maintain different values for the same requested block.

Figure 4C:
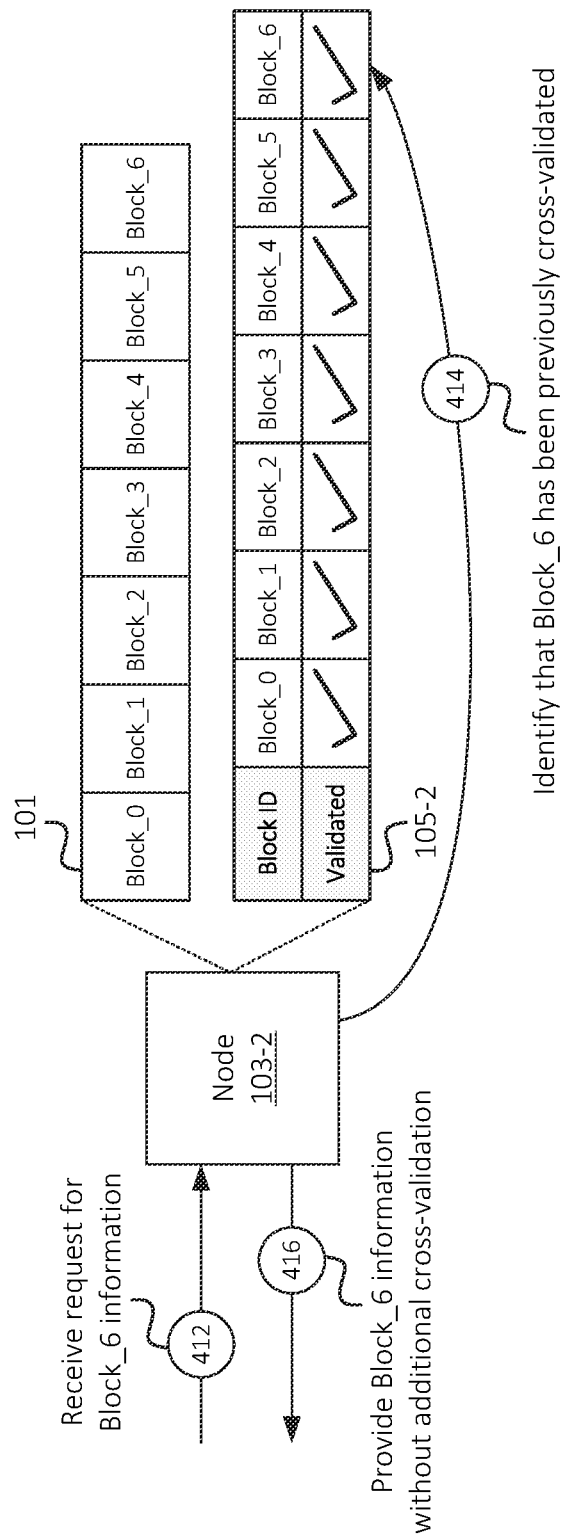
FIG. 4C illustrates an example of providing requested information associated with a record that has already been cross-validated, in accordance with some embodiments.

Once a given block has been cross-validated by a given node 103, the block may be used without a subsequent cross-validation procedure at that node 103. For example, as shown in FIG. 4C, node 103-2 may again receive (at 412) a request for Block_6 information. Node 103-2 may check distributed ledger validation information 105-2 and determine (at 414) that distributed ledger validation information 105-2 indicates that Block_6 has been previously cross-validated (e.g., at 406). Since Block_6 has been previously cross-validated, node 103-2 may provide (at 416) the requested information without an additional cross-validation procedure being performed.

Figure 5:
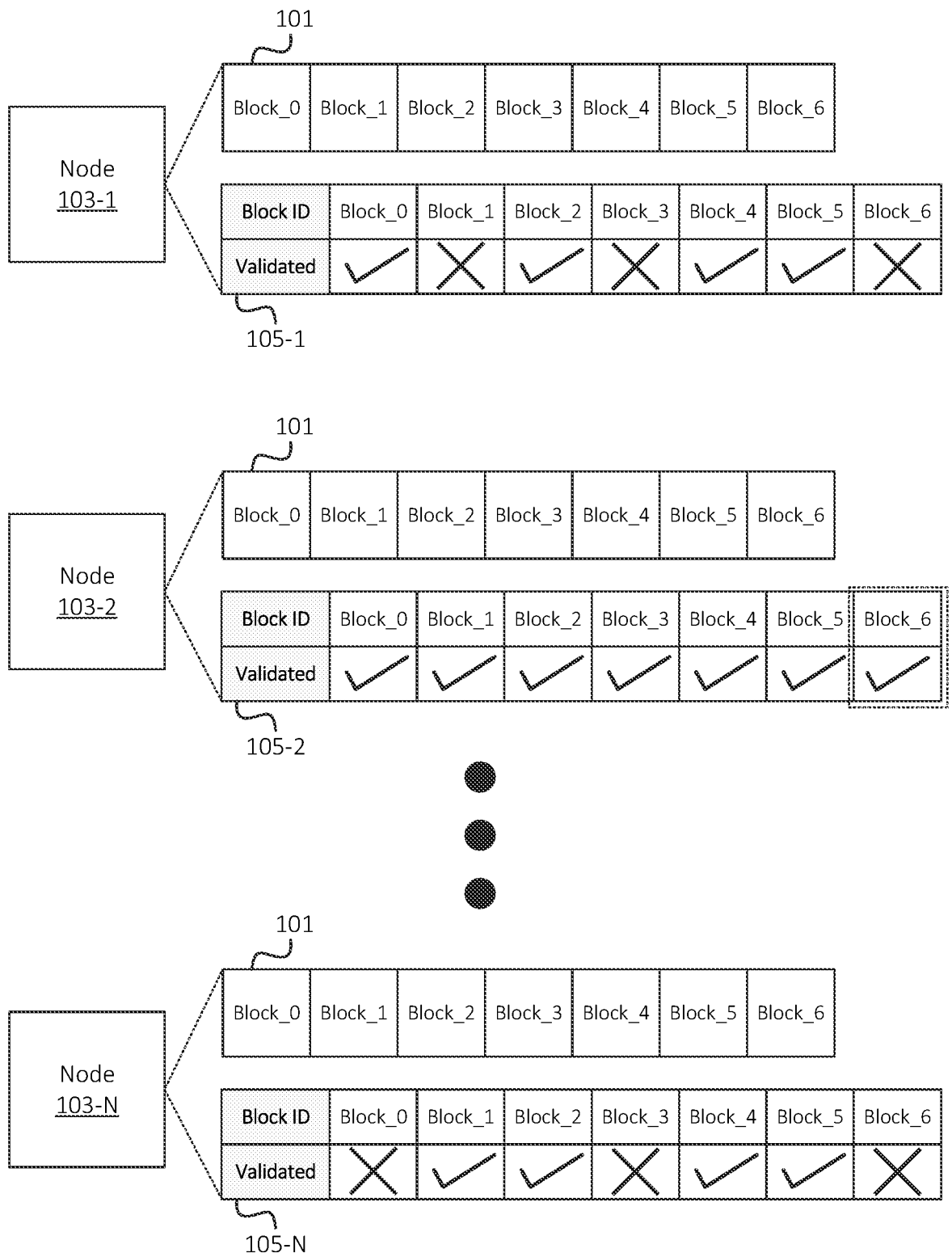
FIG. 5 illustrates examples of instances of validation information that may be concurrently maintained by different nodes associated with a distributed ledger, in accordance with some embodiments.

As discussed above, different nodes 103 may maintain different instances of distributed ledger validation information 105. As shown in FIG. 5, for example, after node 103-2 has cross-validated (e.g., at 406) Block_6, distributed ledger validation information 105-2 may now indicate that Block_6 has been cross-validated (e.g., in contrast to the instance of distributed ledger validation information 105-2, shown in FIG. 3, indicating that Block_6 has not been cross-validated by node 103-2). In this example, since Block_6 has been cross-validated by node 103-2 but not by other nodes 103, other nodes 103 (e.g., node 103-1 and node 103-N) may maintain respective instances of distributed ledger validation information 105, indicating that Block_6 has not been cross-validated by these nodes 103-1 and 103-N.

Figure 6:
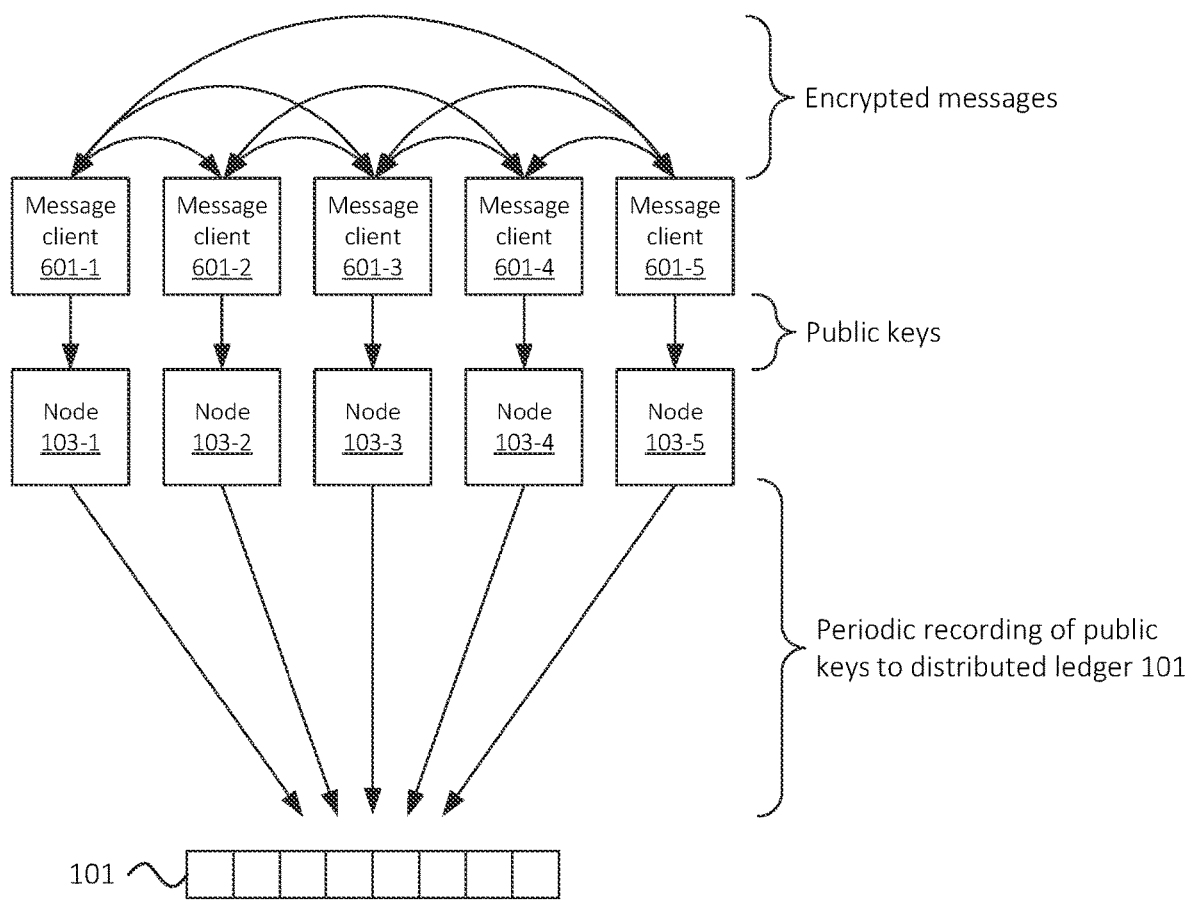
FIG. 6 illustrates an example messaging technique in which secure messages may be decrypted based on public keys recorded to a distributed ledger, in accordance with some embodiments.

In some embodiments, a secure messaging technique may utilize distributed ledger 101 for the distribution, exchange, etc. of public keys that may be used in the secure messaging technique. For example, as shown in FIG. 6, a set of five nodes 103-1 through 103-5 may be associated with participants in a group messaging session in which encrypted messages may be sent between one or more message clients 601-1 through 601-5. In some embodiments, each one of nodes 103-1 through 103-5 may be associated with a particular respective message client 601. For example, node 103-1 and message client 601-1 may be executed by, communicatively coupled to, and/or otherwise associated with the same UE or other type of device. Similarly, node 103-2 and message client 601-2 may be executed by, communicatively coupled to, and/or otherwise associated with the same UE or other type of device, and so on. In some embodiments, nodes 103 and respective message clients 601 may communicate via an API or other suitable communication pathway.

As discussed below, message clients 601 may encrypt messages, such as chat messages, instant messages, text messages, video messages, or the like, and may send the encrypted messages to one or more recipients (e.g., some or all of the other message clients 601). The encrypted messages may be associated with one or more keys that are recorded to distributed ledger 101, as discussed below. The recipient message clients 601 may receive the encrypted messages and may use appropriate keys recorded to distributed ledger 101 in order to decrypt the messages. In some embodiments, nodes 103 may periodically, intermittently, and/or on some other basis "refresh" the keys recorded distributed ledger 101. In some scenarios, multiple (e.g., all) nodes 103 may refresh their respective keys (e.g., simultaneously or within a relatively short time). As discussed above, nodes 103 may record new blocks, including the refreshed keys, without performing a cross-validation procedure upon receipt of such blocks. Waiting until the information associated with a given block is requested or otherwise used (e.g., waiting until a particular node 103 receives a request from a particular message client 601 for a particular key) may serve to reduce network traffic that would otherwise be associated with a cross-validation procedure performed by each node 103 upon the receipt of each block that includes a new key.

Figure 7:
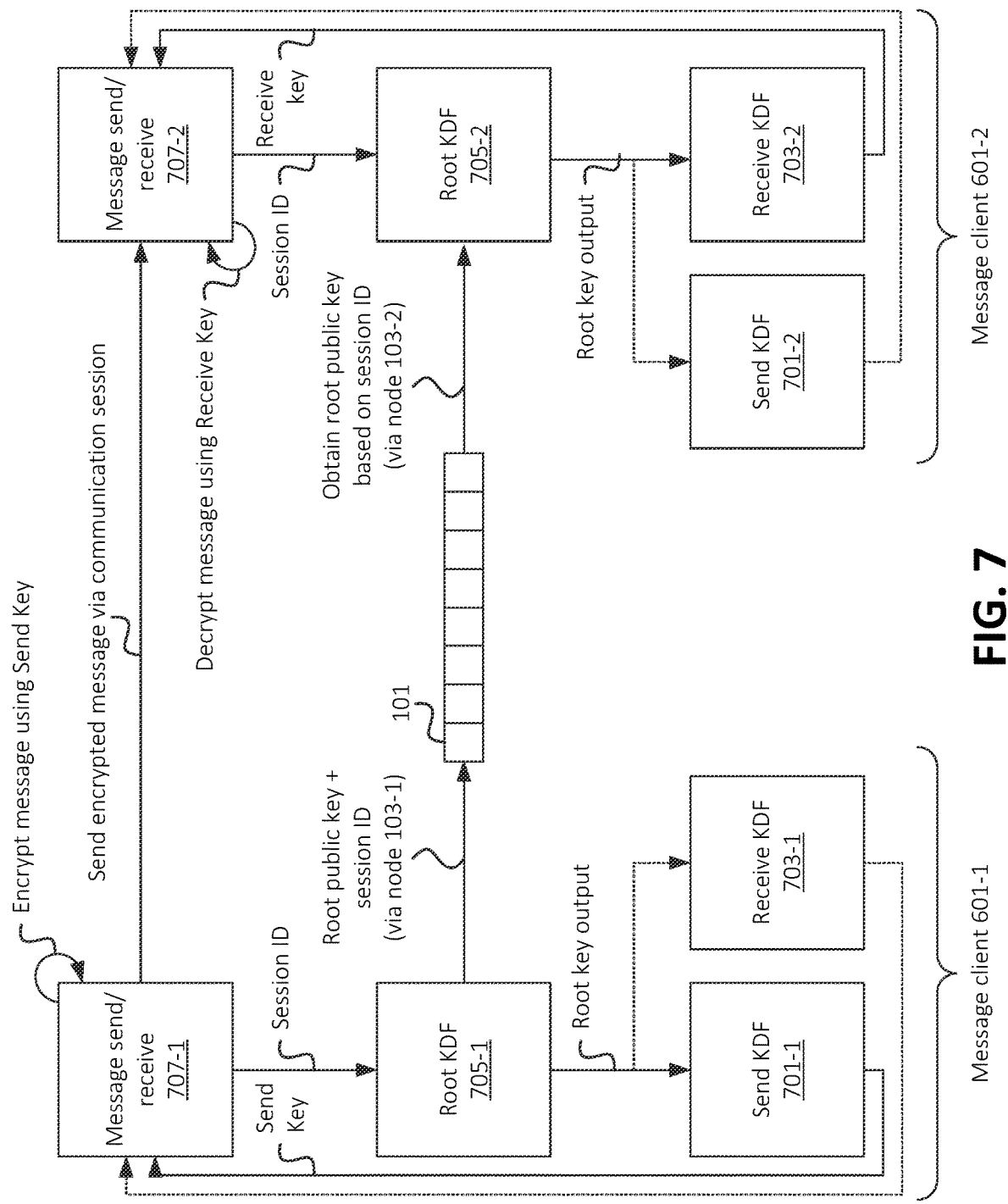
FIG. 7 illustrates an example secure messaging technique with key distribution via a distributed ledger, in accordance with some embodiments.

FIG. 7 illustrates an example of using a shared public key (e.g., shared via distributed ledger 101, in accordance with some embodiments) in a secure communication technique (e.g., a double ratchet technique) to secure communications between message client 601-1 and 601-2. For example, message client 601-1 may encrypt communications and may send (e.g., via message send/receive component 707-1) the encrypted communications to message client 601-2 (e.g., to message send/receive component 707-2). Message client 601-2 may receive encrypted communications from message client 601-1, may decrypt the communications based on techniques described herein, and may present the decrypted communications (e.g., via a graphical user interface ("GUI") or other suitable manner of presentation). Similarly, message client 601-2 (e.g., message send/receive component 707-2) may encrypt communications, and may send the encrypted communications to message client 601-1 (e.g., to message send/receive component 707-1). Message client 601-1 may receive encrypted communications from message client 601-2, may decrypt the communications, and may present the decrypted communications (e.g., via a GUI or other suitable manner of presentation).

The encryption and/or decryption by message client 601-1 and/or message client 601-2 may be performed using a symmetric key that is generated based on a double ratchet technique, a Signal Protocol technique, and/or other suitable technique. For example, as discussed herein, the symmetric key may be used by a sender (e.g., message client 601-1, in this example) to encrypt a communication, and may be used by a recipient (e.g., message client 601-2, in this example) to decrypt the communication. The symmetric keys may be generated by respective Send Key Derivation Function ("KDF") 701 and/or Receive KDF 703 associated with the sender and/or recipient. The symmetric keys may be generated based on one or more root keys provided by Root KDF 705 to Send KDF 701 and/or Receive KDF 703. For example, Root KDF 705-1 may provide a root key output based on a public key and a private key to Send KDF 701-1, which may generate a send key (e.g., based on the root key output and one or more private keys) that may be used to encrypt communications to be sent by message client 601-1. The private key based on which the root key output is generated may be privately maintained by message client 601-1 (e.g., not sent to message client 601-2), while the public key may be shared with message client 601-2 via distributed ledger 101, in accordance with embodiments described herein. Root KDF 705-1 may provide a different root key output for each message sent and/or received by message client 601-1, based on a public key exchange (e.g., via a Diffie-Hellman key exchange or other suitable procedure) with message client 601-2, which may be performed each time a message is sent by message client 601-1 and/or message client 601-2.

For example, when message client 601-1 sends a message, Root KDF 705-1 may generate a root key output, and may further output a public key based on which the root key output was generated, to distributed ledger 101 (e.g., may instruct node 103-1 to record a block to distributed ledger 101 that includes the public key as a payload of the block). As discussed above, the public key may be provided with a session identifier (e.g., to identify a communication session between message client 601-1 and message client 601-2), an identifier associated with message client 601-1, an identifier associated with message client 601-2, and/or other suitable information based on which message client 601-2 may identify that the public key recorded to distributed ledger 101 is associated with the communication session between message client 601-1 and message client 601-2.

Message client 601-2 (e.g., Root KDF 705-2) may obtain the root public key from distributed ledger 101 based on the session identifier or other suitable identifier, and may generate a root key output based on the obtained public key and a private key (e.g., a different private key than the private key used by Root KDF 705-1 to encrypt the communication). Using distributed ledger 101 to exchange public keys may maintain the integrity of the keys, such as by preventing malicious actors from modifying or "spoofing" keys. Further, using distributed ledger 101 may aid in situations where a given message client 601 (e.g., message client 601-2, in this example) is "offline" or is otherwise unavailable to receive public keys from another message client 601 (e.g., message client 601-1, in this example) at the time that the other message client 601 outputs the public keys.

Root KDF 705-2 may provide the root key output to Receive KDF 703-2, which may generate a receive key based on the root key output and one or more private keys. In accordance with the double ratchet techniques, Signal Protocol techniques, etc., the receive key generated by Receive KDF 703-2 may be the same as the send key output generated by Send KDF 701-1. In this manner, these respective send and receive keys may be an identical symmetric key that may be used to encrypt and decrypt communications, such as the encrypted communication sent by message client 601-1 to message client 601-2 in this example.

While an example is provided here in the context of message client 601-1 encrypting a communication, sending the encrypted communication to message client 601-2, and message client 601-2 decrypting the communication, similar techniques may be performed (e.g., iteratively) for communications encrypted and sent by message client 601-2 to message client 601-1, as denoted by the dashed lines in FIG. 7. For example, Root KDF 705-2 may generate a root key pair, output (e.g., via node 103-2) a public key of the root key pair to distributed ledger 101 for retrieval by message client 601-1, generate a root key output based on the root key pair, and provide the root key output to Send KDF 701-2. Send KDF 701-2 may generate a send key based on the root key output and one or more private keys, and message client 601-2 may encrypt a communication based on the send key. Further, Root KDF 705-1 may retrieve (e.g., via node 103-2) the public key from distributed ledger 101, generate a root key output based on the retrieved public key and one or more private keys, and provide the root key output to Receive KDF 703-1. Receive KDF 703-1 may generate a receive key based on the root key output and one or more private keys, and message client 601-1 may decrypt a communication received from message client 601-2, as encrypted based on a matching send key.

Figure 8:
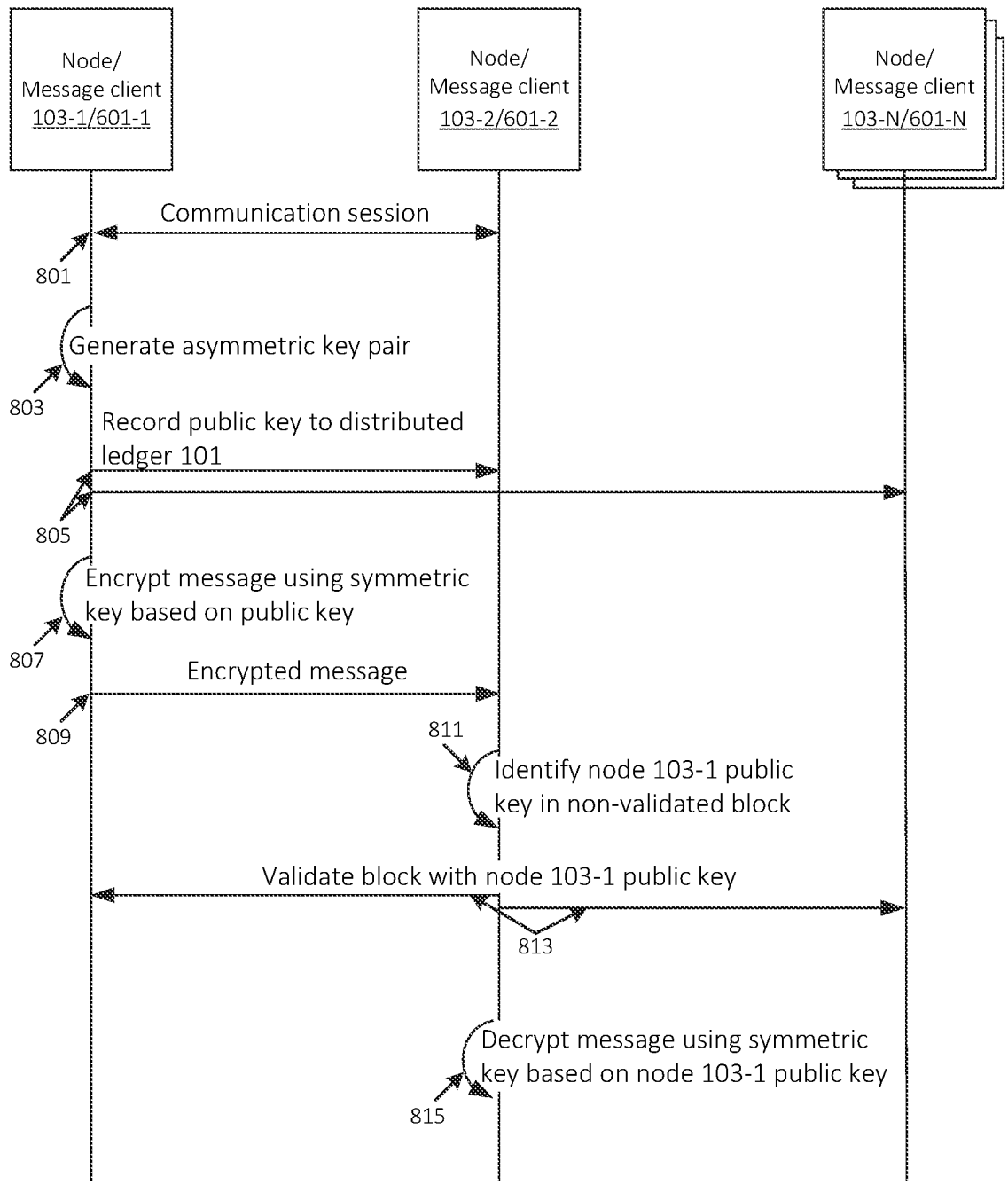
FIG. 8 illustrates an example signal flow of using on-demand cross-validation to validate a record that includes a public key used in a secure messaging technique, in accordance with some embodiments.

FIG. 8 illustrates an example of the use of distributed ledger 101 to exchange public keys in the encryption and/or decryption of secure communications between nodes 103 participating in a secure communication session. In this example, nodes 103-1, 103-2, and/or one or more other nodes 103 may maintain distributed ledger 101. Further, nodes 103-1 and 103-2 may be, and/or may be communicatively coupled to or otherwise associated with, participants in a communication session (e.g., via respective message clients 601-1 and 601-2). For the sake of simplicity, FIG. 8 describes each node 103 as being associated with a respective message client 601. In some embodiments, nodes 103 and message clients 601 may not have a one-to-one relationship as shown in this example. For example, one node 103 may communicate with multiple message clients 601, or one message client 601 may communicate with multiple nodes 103 (e.g., may communicate with different nodes 103 at different times).

As shown, message clients 601-1 and 601-2 may establish (at 801) a secure communication session using any suitable session establishment technique or protocol. The communication session may be associated with a session identifier or other suitable mechanism by which message clients 601-1 and 601-2 may identify the communication session. For example, an initiator of the communication session may generate or otherwise determine an identifier for the communication session, and/or message clients 601-1 and 601-2 may otherwise negotiate or determine an identifier for the communication session.

Message client 601-1 may further generate (at 803) an asymmetric key pair, which may be used as part of a double ratchet technique, a Signal Protocol technique, and/or some other encryption technique used to secure communications between message clients 601-1 and 601-2. For example, the asymmetric key pair generated (at 803) by message client 601-1 may include a public key used in the generation of a send key used to encrypt communications sent to message client 601-2. While not explicitly shown in FIG. 8, message client 601-2 may also generate one or more keys that may be used in the encryption and/or decryption of messages between message clients 601-1 and 601-2, in accordance with the double ratchet technique, Signal Protocol technique, and/or other suitable encryption technique.

Node 103-1 may further provide (at 805) the public key of the generated asymmetric key pair to distributed ledger 101. For example, message client 601-1 may communicate with node 103-1 to instruct or request node 103-1 to record, propose, etc. a block that includes the public key to distributed ledger 101. In some embodiments, the block may include other information, such as an identifier of the established (at 801) communication session, an identifier of message client 601-1, an identifier of a user or UE with which message client 601-1 is associated, etc. Node 103-1 may provide the block (e.g., including the key and/or other information) to node 103-2 and/or one or more other nodes 103. Node 103-1 may also record the block to its own local copy of distributed ledger 101. As discussed above, nodes 103 receiving the block, including node 103-1, may forgo cross-validating the block upon receipt of the block.

Message client 601-1 may further encrypt (at 807) a message for message client 601-2 (e.g., a message directed to a user associated with message client 601-2) using a symmetric key (e.g., a send key, as similarly discussed above) that message client 601-1 generates based on the public key, one or more private keys, and/or one or more KDFs (e.g., Send KDF 701). Message client 601-1 may proceed to output (at 809) the encrypted message to message client 601-2. Message client 601-2 may identify encrypted message (e.g., may identify a communication session identifier associated with the encrypted message, an identifier of message client 601-1 from which the message was sent, and/or other suitable identifying information), and may determine that a corresponding public key should be retrieved (e.g., from distributed ledger 101). As such, message client 601-2 may request, from node 103-2, the public key that can be used to decrypt the message (received at 809).

In accordance with some embodiments, based on the request for the public key, node 103-2 may identify (at 811) that that the block recorded (at 805) to distributed ledger 101 includes the public key (e.g., matches a communication session identifier or other suitable criteria associated with the request), and may further identify that node 103-2 has not cross-validated this block (e.g., based on distributed ledger validation information 105-2 associated with by node 103-2). Accordingly, node 103-2 may cross-validate (at 813) the block by communicating with one or more other nodes 103 to verify that the information included in the local copy of distributed ledger 101 of node 103-2 (e.g., the information in the particular block for which information is being requested) is the same as in local copies of distributed ledger 101 as maintained by some or all other nodes 103 that maintain distributed ledger 101. Assuming that the block has been cross-validated (at 813), node 103-2 may provide the requested information (e.g., the payload of the block which may be or may include the requested public key) to message client 601-2, which may use the public key to decrypt (at 815) the message, such as by generating and using a corresponding symmetric key.

While FIG. 8 shows an example of one message being sent from message client 601-1 to Node message client 601-2, similar techniques may be employed when message client 601-1 sends additional messages to message client 601-2, and/or when message client 601-2 sends messages to message client 601-1. For example, message client 601-2 may generate a subsequent asymmetric key pair that is derived from and/or is otherwise based on the retrieved (at 811) public key, and may output a public key of the subsequent asymmetric key pair to distributed ledger 101. Message client 601-2 may utilize this subsequently generated public key to generate a send key, and message client 601-1 may utilize this subsequently generated public key, retrieved (e.g., by node 103-1) from distributed ledger 101, to generate a receive key, as described above.

Figure 9:
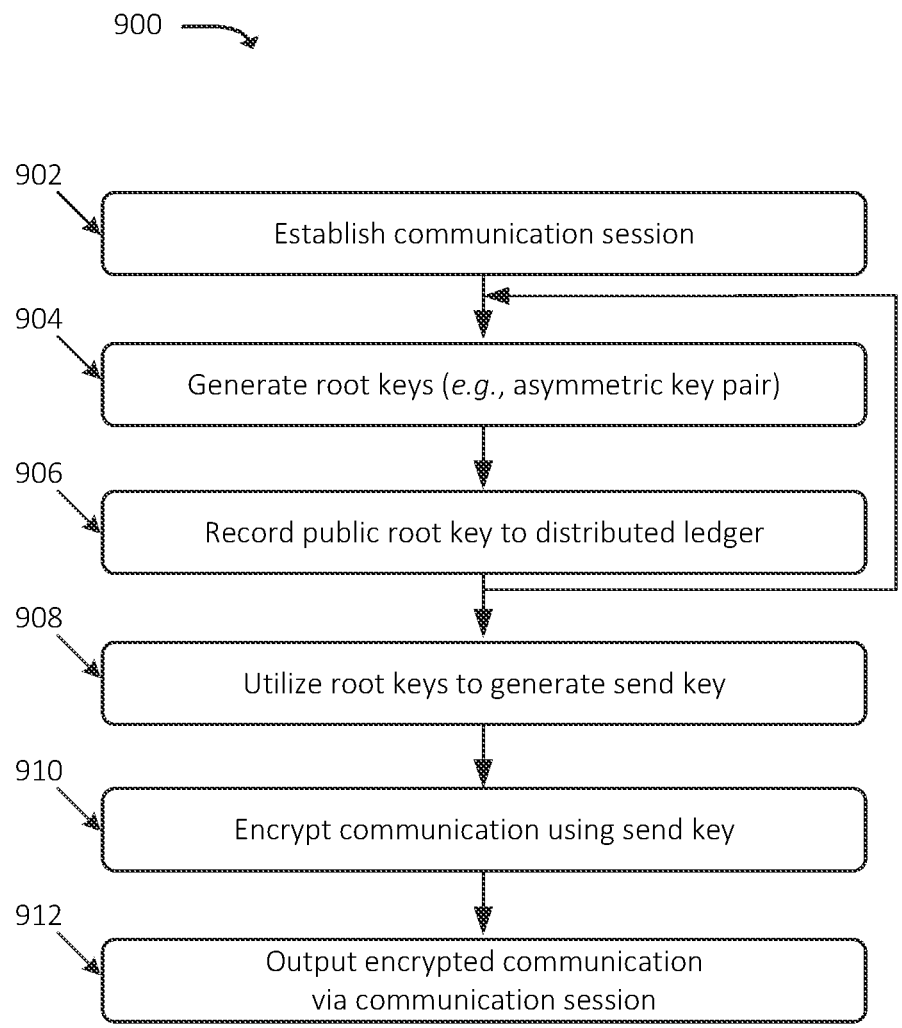
FIGS. 9 and 10 illustrate example processes for a secure messaging technique with key distribution via a distributed ledger, in accordance with some embodiments.
Figure 10:
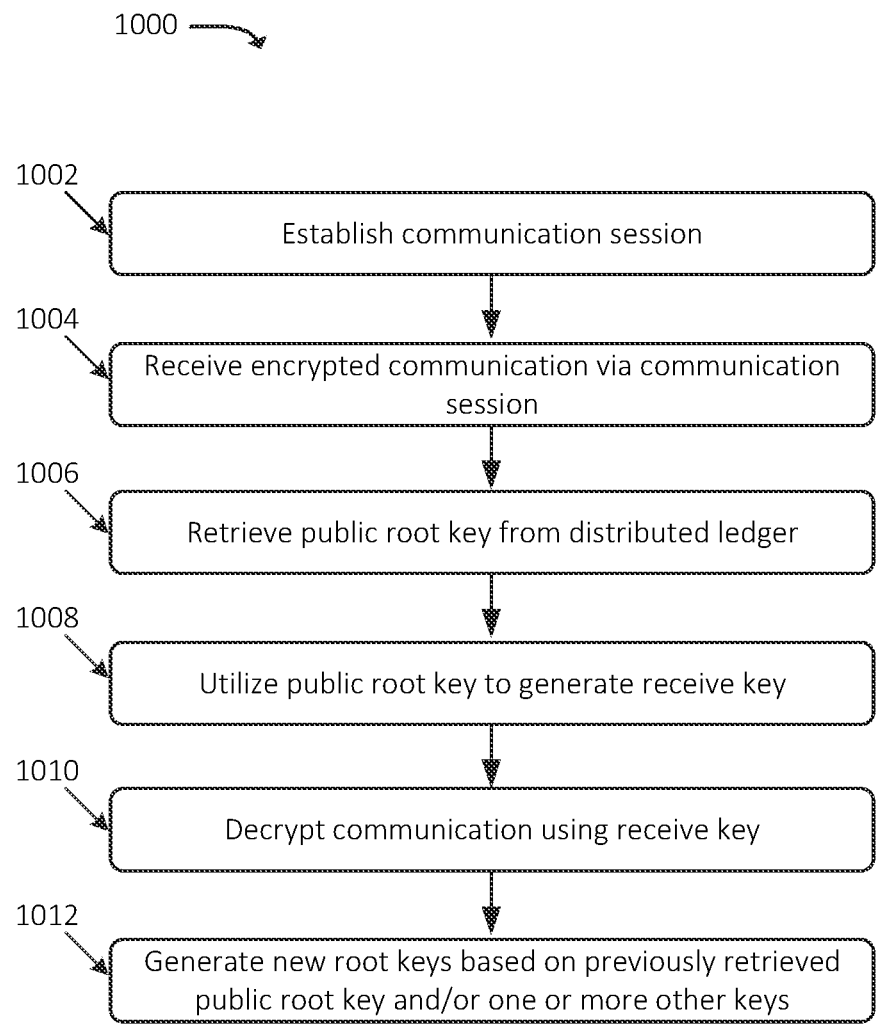

FIGS. 9 and 10 illustrate example processes 900 and 1000, respectively, for utilizing distributed ledger techniques to share and/or exchange public keys. In the examples provided herein, the key exchange may be part of a Diffie-Hellman key exchange, a key exchange portion of a Signal Protocol technique, a key exchange portion of a double ratchet technique, and/or some other suitable secure exchange of public keys. In some embodiments, some or all of processes 900 and/or 1000 may be performed by one or more message clients 601 and/or nodes 103 (e.g., UEs that include, execute, and/or are otherwise associated with message clients 601 and/or nodes 103), such as message clients 601 that are engaged in a communication session with each other.

As shown, process 900 may include establishing (at 902) a communication session with one or more message clients 601. The communication session may be associated with a session identifier or other identifier based on which message clients 601 that are participants of the communication session may identify messages exchanged with one another and/or public keys, associated with the communication session, recorded to distributed ledger 101 in accordance with embodiments described herein.

Process 900 may further include generating (at 904) a set of root keys, which may include an asymmetric key pair. For example, as discussed above, the root keys may include a private key which may be maintained securely by message client 601, and a public key which may ultimately be shared with one or more other message clients 601 (e.g., another participant in the communication session).

Process 900 may additionally include recording (at 906) the public root key (e.g., the public key of the asymmetric key pair generated at 904) to distributed ledger 101. For example, message client 601 may output the public key to distributed ledger 101, and distributed ledger 101 may be used to propagate the information to one or more nodes 103 of distributed ledger 101. Nodes 103 may form a consensus regarding the addition of the provided public key to one or more records of distributed ledger 101, and may maintain an immutable record of the provided public key. In some embodiments, the record may include a timestamp, a block identifier, and/or other mechanism by which a recency or age of the record may be determined. As similarly described above, the record may further include a communication session identifier, an identifier of message client 601 from which the information was received, and/or other suitable information.

As discussed above, in some embodiments, message client 601 may periodically, intermittently, and/or on some other basis, generate (at 904) a new root key and record (at 906) the public root key to distributed ledger 101. For example, message client 601 may periodically "refresh" its keys to maintain security of the messaging session, to keep the keys near the end of the sequence of distributed ledger 101 (e.g., in order to avoid removal of the keys in instances where older records of distributed ledger 101 are archived or removed), and/or for other reasons.

Process 900 may also include utilizing (at 908) the root keys to generate a send key. For example, as discussed above, Root KDF 705 may utilize the root keys (e.g., including the root public key, as well as the root private key and/or one or more other keys) to generate a root key output, and may provide the root key output to another KDF, such as Send KDF 701. Send KDF 701 may generate a send key based on the root key output from Root KDF 705 and/or based on one or more other keys or functions. As discussed above, the generated send key may be a symmetric key that may be identical to a receive key generated by a recipient of the public key, based on a Signal Protocol technique, a double ratchet technique, etc.

Process 900 may further include encrypting (at 910) a communication using the send key. Process 900 may additionally include outputting (at 912) the encrypted communication via the communication session, such as to a message client 601 with which the communication session was established (at 902).

As shown in FIG. 10, process 1000 may include establishing (at 1002) a communication session. For example, as similarly discussed above, message client 601 may establish a communication session with one or more other message clients 601. The communication session may be associated with a suitable identifier, based on which the message clients 601 participating in the communication session may identify communications associated with the communication session, including encrypted messages, public keys, and/or other information.

Process 1000 may further include receiving (at 1004) an encrypted communication via the communication session. For example, the communication may have been encrypted using one or more KDFs, where the input to the one or more KDFs include the public root key and one or more other keys (e.g., one or more private keys, one or more KDF outputs, etc.).

Process 1000 may further include retrieving (at 1006) a public root key from distributed ledger 101. In some embodiments, distributed ledger 101 and/or one or more devices or systems communicatively coupled to distributed ledger 101 may "push" the public root key to distributed ledger 101. For example, the one or more devices or systems may identify a particular block that includes an identifier of message client 601 (e.g., where the particular block includes the identifier of message client 601 and a public root key), may identify a particular block that includes an identifier of the communication session (e.g., where the particular block includes the identifier of the communication session and a public root key), etc. Additionally, or alternatively, message client 601 may "pull" the information from distributed ledger 101 based on a suitable identifier (e.g., an identifier of message client 601, an identifier of the communication session, etc.).

Process 1000 may additionally include utilizing (at 1008) the public root key to generate a receive key. For example, as discussed above, message client 601 may utilize one or more KDFs, such as Root KDF 705 and/or Receive KDF 703, to generate a receive key. The receive key may be a symmetric key with respect to a key used to encrypt a communication received by message client 601 via the communication session. For example, as discussed above, the receive key may be identical to a send key used by a sender of the communication, where the send key was also generated based on one or more KDFs and at least the public root key. For example, the sender and recipient message clients 601 may perform double ratchet techniques, Signal Protocol techniques, or the like, to respectively encrypt and decrypt the communication, without transmitting or sharing the symmetric key itself.

Process 1000 may further include decrypting (at 1010) the communication, received via the communication session, using the generated receive key. For example, message client 601 may apply one or more functions to decrypt the receive message using the receive key, which, as discussed above, may be the same as a send key used to encrypt the communication.

Process 1000 may additionally include generating (at 1012) a new set of root keys based on the previously retrieved public root key and one or more other root keys. For example, once message client 601 generates the receive key, the public root key (retrieved at 1006) may be discarded and/or not used for sending messages from message client 601. In some situations, message client 601 may maintain the public root key and apply techniques described above to decrypt subsequent communications from the sender in situations where the sender sends multiple communications in a row without any intervening messages from message client 601. The new set of root keys may be generated based on the receive key (generated at 1008), the public root key (retrieved at 1006), and/or one or more other suitable keys. Message client 601 may then proceed to output the newly generated public root key to distributed ledger 101, as similarly described above with respect to operation 906 of process 900, may generate (e.g., similar to operation 908) a new send key based on the newly generated public root key, etc.

Figure 11A:
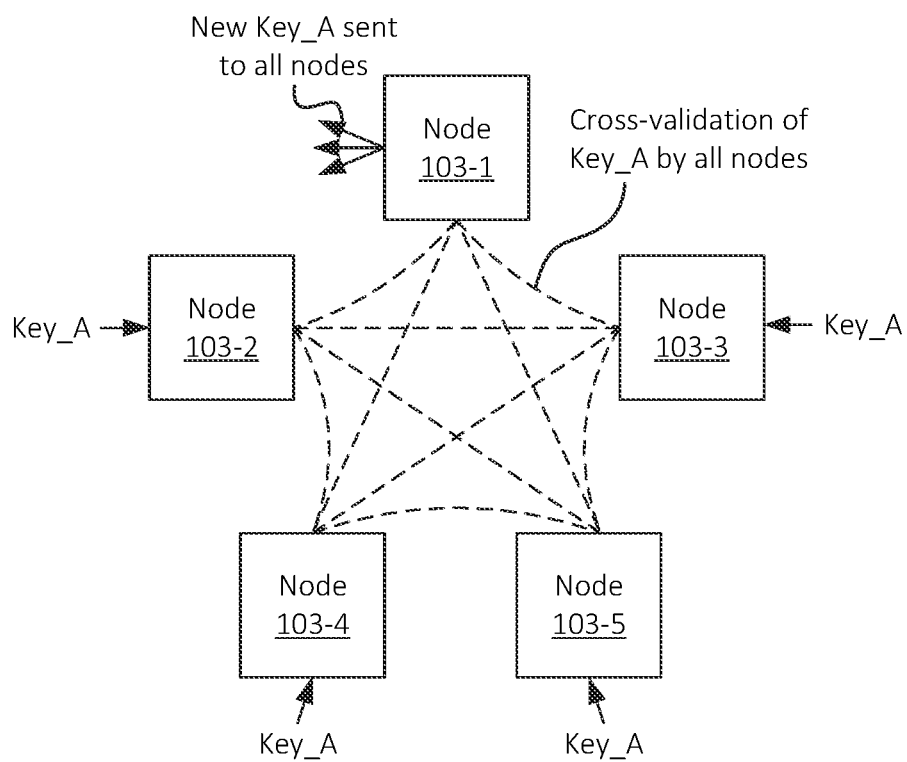
FIGS. 11A and 11B illustrate an example of cross-validating all records as they are added to a distributed ledger.
Figure 11B:
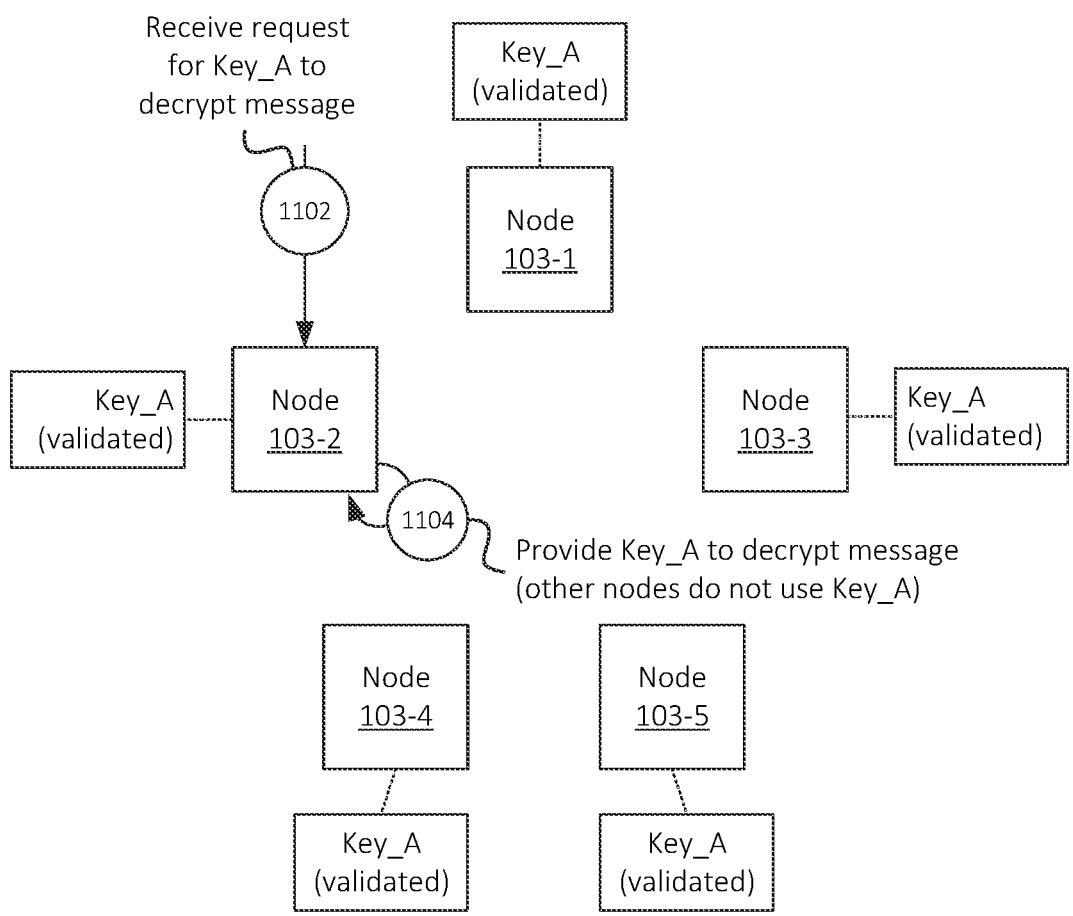

FIGS. 11A and 11B illustrate an example of cross-validation of blocks by each node 103 that receives blocks that are proposed, recorded, committed, etc. to distributed ledger 101. Assume, for this example, that example nodes 103-1 through 103-5 maintain distributed ledger 101. As shown in FIG. 11A, assume that node 103-1 generates, proposes, provides, etc. a block that includes particular information (e.g., a public key for use in a secure messaging environment, as discussed above), such as "Key_A." This block, that includes Key_A, may be received by each node 103-1 through 103-5, and recorded to the respective local copy of distributed ledger 101 as maintained by each such node 103. Each one of these nodes 103 may communicate with some or all of the other nodes 103 to cross-validate the newly received block. For example, node 103-1 may communicate with nodes 103-2 through 103-5, node 103-2 may communicate with node 103-1 and nodes 103-3 through 103-5, node 103-3 may communicate with nodes 103-1, 103-2, 103-3, and 103-5, and so on.

Thus, as shown in FIG. 11B, each node 103-1 through 103-5 may maintain the newly received block which includes Key_A, and this block may have been cross-validated by each node 103. That is, each node 103 may have verified that at least a threshold quantity, proportion, etc. of other nodes 103 have also recorded this same information to their local copies of distributed ledger 101. As further shown, node 103-2 may receive (at 1102) a request for this particular information (e.g., a request for Key_A), and may provide (at 1104) the requested information. As similarly discussed above, Key_A may be used to decrypt an encrypted message.

Although node 103-2 is able to provide the requested key that can be used to decrypt the encrypted message, the copy of Key_A, as maintained by nodes 103-1, 103-3, 103-4, and 103-5 may never end up being requested from these nodes 103. As such, the cross-validation of this information by all nodes 103 (e.g., as shown in FIG. 11A) may not end up being relevant to the actual use case for the information.

Figure 12A:
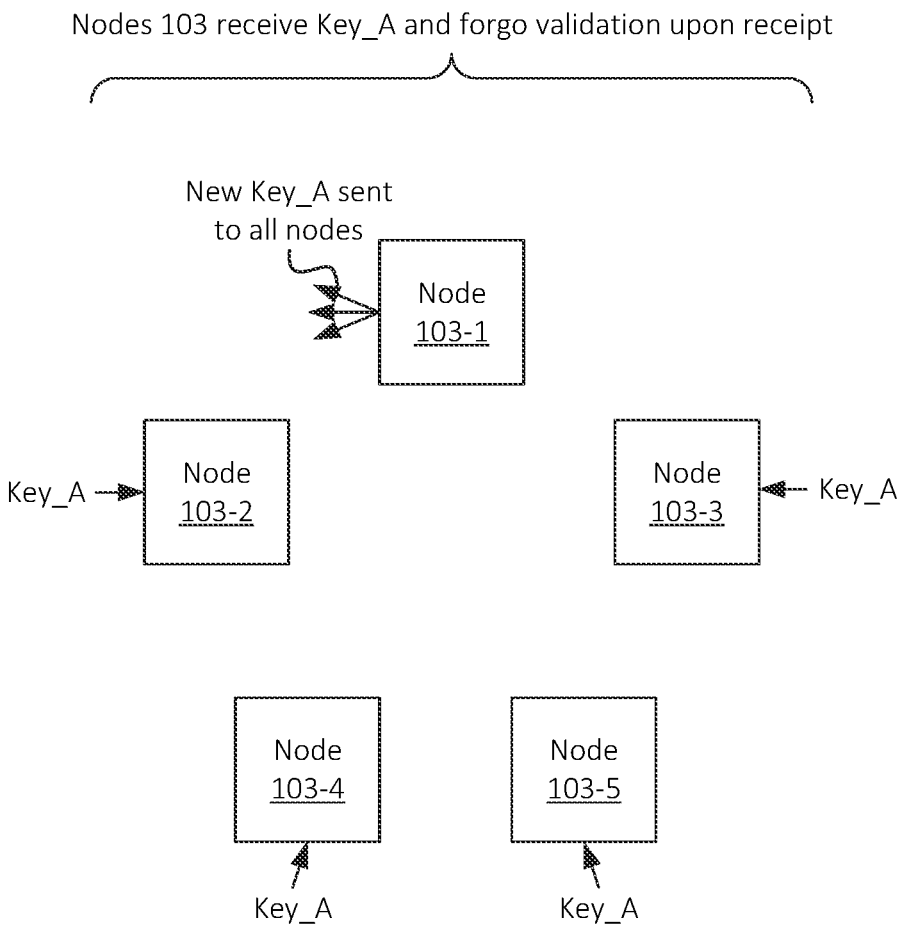
FIGS. 12A and 12B illustrate an example of cross-validating records only when they are utilized, in accordance with some embodiments.
Figure 12B:
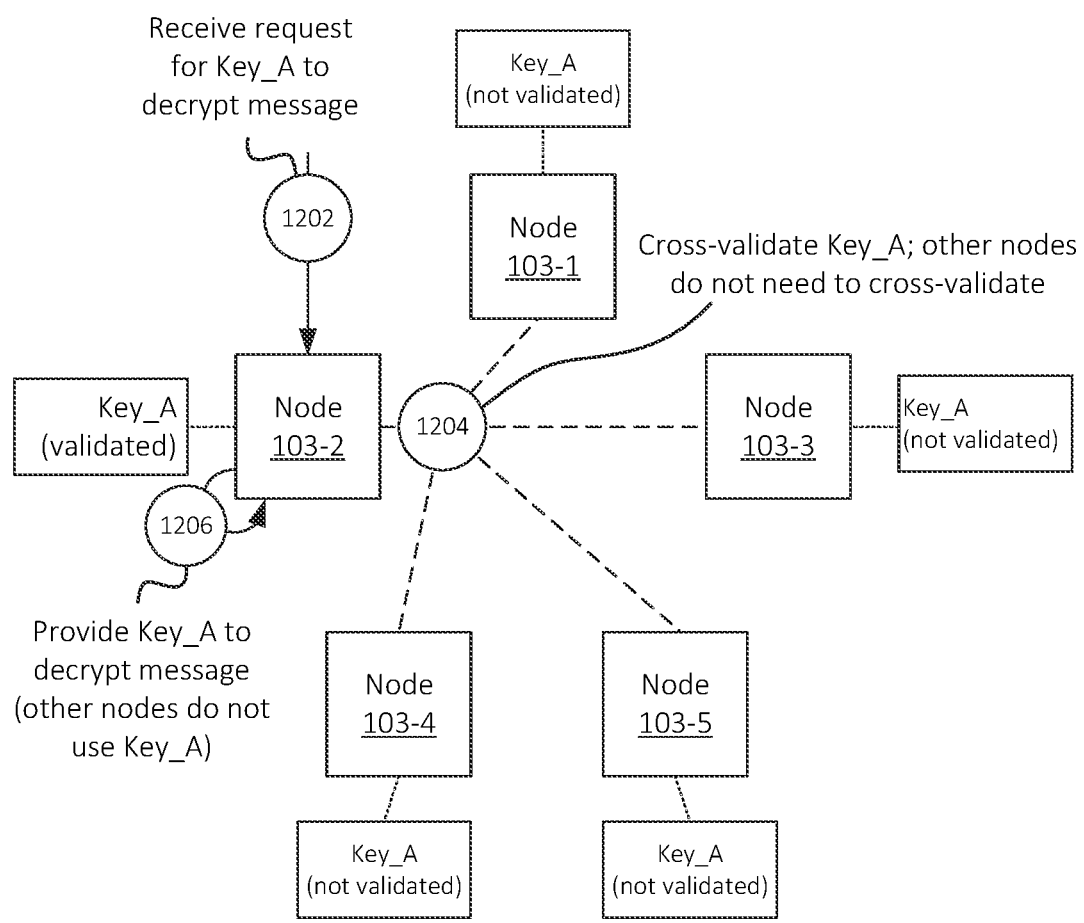

On the other hand, FIGS. 12A and 12B illustrate a similar scenario, but with the on-demand cross-validation described herein. For example, as shown in FIG. 12A, and as similarly described in FIG. 11A, node 103-1 may output a block with Key_A to nodes 103-2 through 103-5. In accordance with embodiments described herein, nodes 103-1 through 103-5 may record this block to their respective local copies of distributed ledger 101, and may also update respective distributed ledger validation information 105 to indicate that this block has not been cross-validated.

In FIG. 12B, as similarly discussed with respect to FIG. 11B, node 103-2 may receive (at 1202) a request for information stored in this block (e.g., a request for Key_A, in order to use Key_A to decrypt an encrypted message). Based on receiving (at 1202) the request for the information in this block, node 103-2 may perform (at 1204) an on-demand cross-validation procedure, which may include communicating with some or all other nodes 103 to verify that the other nodes 103 have recorded the same information associated with the block to distributed ledger 101. Node 103-2 may, once the block is validated, provide (at 1206) the requested information (e.g., to a particular message client 601, which may use the provided information to decrypt an encrypted message). In this example, the cross-validation by node 103-2 and not by other nodes 103 may conserve network resources that may otherwise have been used in a cross-validation procedure whereby the other nodes 103 also cross-validate the received block. Since node 103-2 is the only node 103 that actually utilizes the information in the block, the other nodes 103 may not ever need to cross-validate this particular block (e.g., may never receive a request for the information included in the block).

Figure 13:
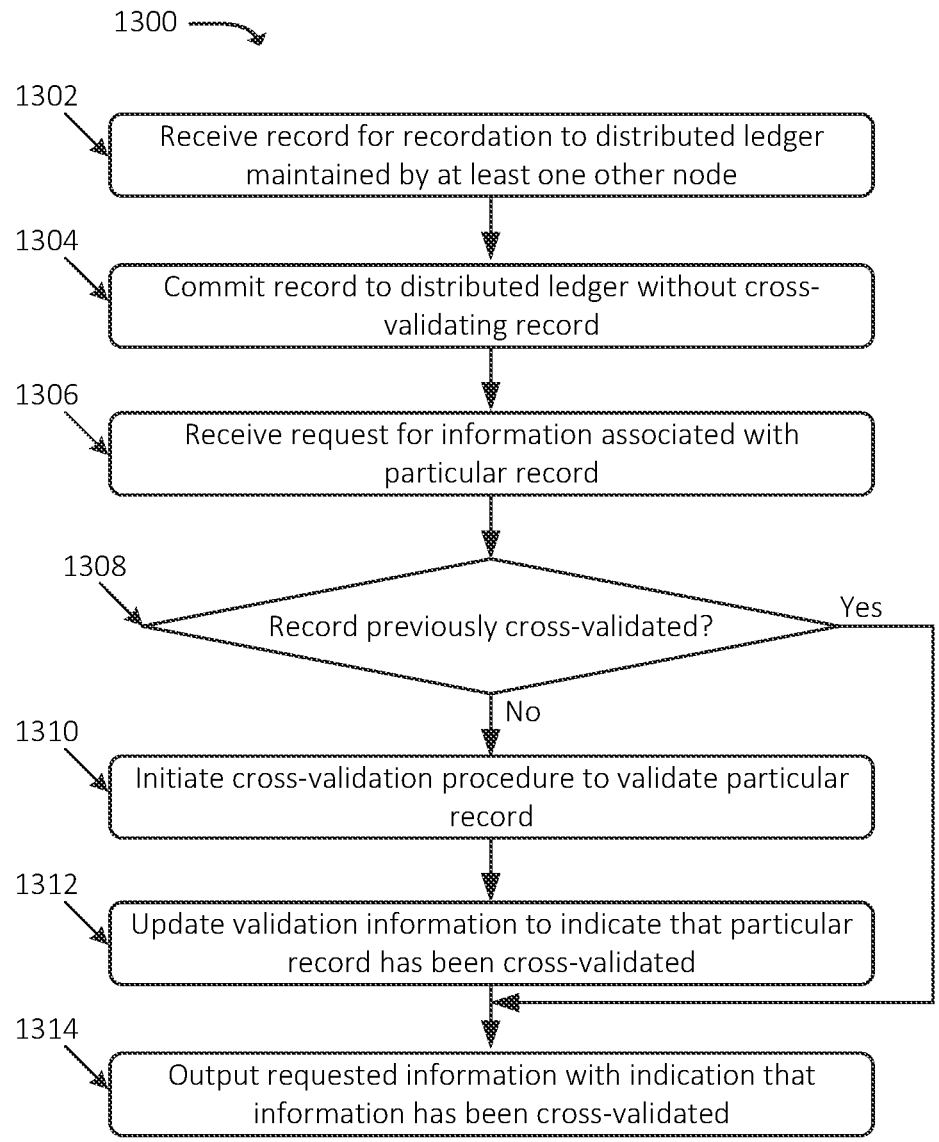
FIG. 13 illustrates an example process for on-demand cross-validation of records added to a distributed ledger, in accordance with some embodiments.

FIG. 13 illustrates an example process 1300 for an on-demand cross-validation of records added to distributed ledger 101, in accordance with some embodiments. In some embodiments, some or all of process 1300 may be performed by node 103. In some embodiments, some or all nodes 103, associated with a respective distributed ledger 101, may perform some or all of process 1300.

As shown, process 1300 may include receiving (at 1302) a record (e.g., a block, information to include in a block, etc.) for recordation to distributed ledger 101, which may be maintained by node 103 and at least one other node 103. For example, as discussed above, the record may include a public key used for a secure messaging scheme, a smart contract, an NFT, asset transaction and/or provenance information, and/or other suitable information.

Process 1300 may further include committing (at 1304) the record to distributed ledger 101 without cross-validating the record. For example, node 103 may add the record to a local copy of distributed ledger 101, as maintained by node 103. Node 103 may, in some embodiments, forgo communicating with other nodes 103 to cross-validate the record. For example, node 103 may forgo requesting a hash of the record and/or other associated information from the other nodes 103. Additionally, or alternatively, node 103 may forgo initiating or invoking a consensus mechanism by which at least a threshold quantity or proportion of nodes 103 indicate that the record is validated. While the record may remain in an "invalid," "not validated," or "not yet valid" state, the record may be committed to distributed ledger 101 inasmuch as the local copy of distributed ledger 101 includes the record. In situations where node 103 "uses" distributed ledger 101, such as computing a hash of the entire distributed ledger 101, node 103 may include this record in distributed ledger 101 (e.g., when computing the hash of distributed ledger 101).

Process 1300 may additionally include receiving (at 1306) a request for information associated with the particular record. For example, node 103 may receive the request via an API, from a dApp, from a messaging application, from a user, etc. The request may include query terms, a block identifier, and/or other suitable information based on which node 103 may identify which record is being requested.

Process 1300 may also include determining (at 1308) whether the requested record has previously been cross-validated. For example, as discussed above, node 103 may maintain distributed ledger validation information 105, indicating which records have or have not been cross-validated. If the requested record has not been previously cross-validated (at 1308—NO), then process 1300 may further include initiating (at 1310) a cross-validation procedure to validate the particular record. For example, node 103 may request that some or all other nodes 103, associated with distributed ledger 101, verify or validate the record. In some embodiments, such cross-validation procedure may include some or all nodes 103 providing a hash of the record, a value extracted from the record, and/or other suitable information based on which node 103 may determine whether the other nodes 103 have received, recorded, etc. the same information for the record.

Process 1300 may additionally include updating (at 1312) the validation information, maintained by node 103, to indicate that the particular record has been cross-validated. As discussed above, different nodes 103 may maintain different instances of distributed ledger validation information 105, as different nodes 103 may or may not have performed cross-validation procedures with respect to the same records.

Process 1300 may also include outputting (at 1314) the requested information. Outputting the requested information may also include outputting an indication that the requested information has been cross-validated, which may indicate to a requestor that multiple nodes 103 maintain the same information, thus alleviating or eliminating concerns regarding the integrity of the information.

In situations where the requested record has already been previously cross-validated (at 1308—YES), then node 103 may output (at 1314) the requested information without initiating (at 1310) the cross-validation procedure. For example, in situations where the cross-validation procedure has already been performed and distributed ledger validation information 105 has already been updated, node 103 may forgo initiating the cross-validation procedure again for the same record.

Figure 14:
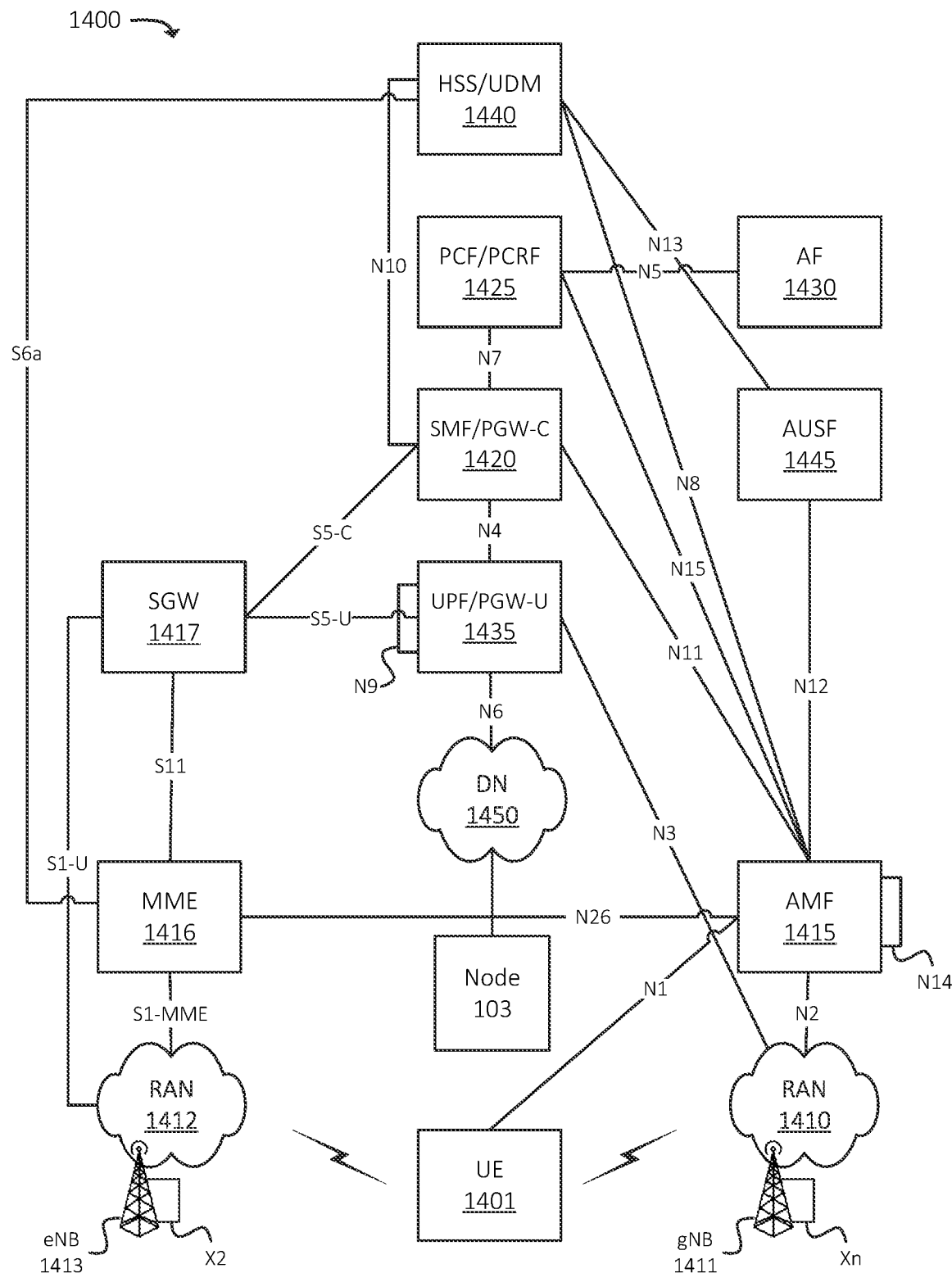
FIG. 14 illustrates an example environment in which one or more embodiments, described herein, may be implemented.

FIG. 14 illustrates an example environment 1400, in which one or more embodiments may be implemented. In some embodiments, environment 1400 may correspond to a Fifth Generation ("5G") network, and/or may include elements of a 5G network. In some embodiments, environment 1400 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1400 may represent or may include a 5G core ("5GC"). As shown, environment 1400 may include UE 1401, RAN 1410 (which may include one or more Next Generation Node Bs ("gNBs") 1411), RAN 1412 (which may include one or more evolved Node Bs ("eNBs") 1413), and various network functions such as Access and Mobility Management Function ("AMF") 1415, Mobility Management Entity ("MME") 1416, Serving Gateway ("SGW") 1417, Session Management Function ("SMF")/Packet Data Network ("PDN") Gateway ("PGW")-Control plane function ("PGW-C") 1420, Policy Control Function ("PCF")/Policy Charging and Rules Function ("PCRF") 1425, Application Function ("AF") 1430, User Plane Function ("UPF")/PGW-User plane function ("PGW-U") 1435, Unified Data Management ("UDM")/Home Subscriber Server ("HSS") 1440, and Authentication Server Function ("AUSF") 1445. Environment 1400 may also include one or more networks, such as Data Network ("DN") 1450. Environment 1400 may include one or more additional devices or systems communicatively coupled to one or more networks (e.g., DN 1450).

The example shown in FIG. 14 illustrates one instance of each network component or function (e.g., one instance of SMF/PGW-C 1420, PCF/PCRF 1425, UPF/PGW-U 1435, UDM/HSS 1440, and/or AUSF 1445). In practice, environment 1400 may include multiple instances of such components or functions. For example, in some embodiments, environment 1400 may include multiple "slices" of a core network, where each slice includes a discrete and/or logical set of network functions (e.g., one slice may include a first instance of SMF/PGW-C 1420, PCF/PCRF 1425, UPF/PGW-U 1435, UDM/HSS 1440, and/or AUSF 1445, while another slice may include a second instance of SMF/PGW-C 1420, PCF/PCRF 1425, UPF/PGW-U 1435, UDM/HSS 1440, and/or AUSF 1445). The different slices may provide differentiated levels of service, such as service in accordance with different Quality of Service ("QoS") parameters.

The quantity of devices and/or networks, illustrated in FIG. 14, is provided for explanatory purposes only. In practice, environment 1400 may include additional devices and/or networks, fewer devices and/or networks, different devices and/or networks, or differently arranged devices and/or networks than illustrated in FIG. 14. For example, while not shown, environment 1400 may include devices that facilitate or enable communication between various components shown in environment 1400, such as routers, modems, gateways, switches, hubs, etc. Alternatively, or additionally, one or more of the devices of environment 1400 may perform one or more network functions described as being performed by another one or more of the devices of environment 1400. Devices of environment 1400 may interconnect with each other and/or other devices via wired connections, wireless connections, or a combination of wired and wireless connections. In some implementations, one or more devices of environment 1400 may be physically integrated in, and/or may be physically attached to, one or more other devices of environment 1400.

UE 1401 may include a computation and communication device, such as a wireless mobile communication device that is capable of communicating with RAN 1410, RAN 1412, and/or DN 1450. UE 1401 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1401 may send traffic to and/or receive traffic (e.g., user plane traffic) from DN 1450 via RAN 1410, RAN 1412, and/or UPF/PGW-U 1435. In some embodiments, UE 1401 may include, may implement, may be communicatively coupled to, and/or may otherwise be associated with one or more nodes 103.

RAN 1410 may be, or may include, a 5G RAN that includes one or more base stations (e.g., one or more gNBs 1411), via which UE 1401 may communicate with one or more other elements of environment 1400. UE 1401 may communicate with RAN 1410 via an air interface (e.g., as provided by gNB 1411). For instance, RAN 1410 may receive traffic (e.g., user plane traffic such as voice call traffic, data traffic, messaging traffic, etc.) from UE 1401 via the air interface, and may communicate the traffic to UPF/PGW-U 1435 and/or one or more other devices or networks. Further, RAN 1410 may receive signaling traffic, control plane traffic, etc. from UE 1401 via the air interface, and may communicate such signaling traffic, control plane traffic, etc. to AMF 1415 and/or one or more other devices or networks. Additionally, RAN 1410 may receive traffic intended for UE 1401 (e.g., from UPF/PGW-U 1435, AMF 1415, and/or one or more other devices or networks) and may communicate the traffic to UE 1401 via the air interface.

RAN 1412 may be, or may include, a LTE RAN that includes one or more base stations (e.g., one or more eNBs 1413), via which UE 1401 may communicate with one or more other elements of environment 1400. UE 1401 may communicate with RAN 1412 via an air interface (e.g., as provided by eNB 1413). For instance, RAN 1412 may receive traffic (e.g., user plane traffic such as voice call traffic, data traffic, messaging traffic, signaling traffic, etc.) from UE 1401 via the air interface, and may communicate the traffic to UPF/PGW-U 1435 (e.g., via SGW 1417) and/or one or more other devices or networks. Further, RAN 1412 may receive signaling traffic, control plane traffic, etc. from UE 1401 via the air interface, and may communicate such signaling traffic, control plane traffic, etc. to MME 1416 and/or one or more other devices or networks. Additionally, RAN 1412 may receive traffic intended for UE 1401 (e.g., from UPF/PGW-U 1435, MME 1416, SGW 1417, and/or one or more other devices or networks) and may communicate the traffic to UE 1401 via the air interface.

AMF 1415 may include one or more devices, systems, Virtualized Network Functions ("VNFs"), Cloud-Native Network Functions ("CNFs"), etc., that perform operations to register UE 1401 with the 5G network, to establish bearer channels associated with a session with UE 1401, to hand off UE 1401 from the 5G network to another network, to hand off UE 1401 from the other network to the 5G network, manage mobility of UE 1401 between RANs 1410 and/or gNBs 1411, and/or to perform other operations. In some embodiments, the 5G network may include multiple AMFs 1415, which communicate with each other via the N14 interface (denoted in FIG. 14 by the line marked "N14" originating and terminating at AMF 1415).

MME 1416 may include one or more devices, systems, VNFs, CNFs, etc., that perform operations to register UE 1401 with the EPC, to establish bearer channels associated with a session with UE 1401, to hand off UE 1401 from the EPC to another network, to hand off UE 1401 from another network to the EPC, manage mobility of UE 1401 between RANs 1412 and/or eNBs 1413, and/or to perform other operations.

SGW 1417 may include one or more devices, systems, VNFs, CNFs, etc., that aggregate traffic received from one or more eNBs 1413 and send the aggregated traffic to an external network or device via UPF/PGW-U 1435. Additionally, SGW 1417 may aggregate traffic received from one or more UPF/PGW-Us 1435 and may send the aggregated traffic to one or more eNBs 1413. SGW 1417 may operate as an anchor for the user plane during inter-eNB handovers and as an anchor for mobility between different telecommunication networks or RANs (e.g., RANs 1410 and 1412).

SMF/PGW-C 1420 may include one or more devices, systems, VNFs, CNFs, etc., that gather, process, store, and/or provide information in a manner described herein. SMF/PGW-C 1420 may, for example, facilitate the establishment of communication sessions on behalf of UE 1401. In some embodiments, the establishment of communications sessions may be performed in accordance with one or more policies provided by PCF/PCRF 1425.

PCF/PCRF 1425 may include one or more devices, systems, VNFs, CNFs, etc., that aggregate information to and from the 5G network and/or other sources. PCF/PCRF 1425 may receive information regarding policies and/or subscriptions from one or more sources, such as subscriber databases and/or from one or more users (such as, for example, an administrator associated with PCF/PCRF 1425).

AF 1430 may include one or more devices, systems, VNFs, CNFs, etc., that receive, store, and/or provide information that may be used in determining parameters (e.g., quality of service parameters, charging parameters, or the like) for certain applications.

UPF/PGW-U 1435 may include one or more devices, systems, VNFs, CNFs, etc., that receive, store, and/or provide data (e.g., user plane data). For example, UPF/PGW-U 1435 may receive user plane data (e.g., voice call traffic, data traffic, etc.), destined for UE 1401, from DN 1450, and may forward the user plane data toward UE 1401 (e.g., via RAN 1410, SMF/PGW-C 1420, and/or one or more other devices). In some embodiments, multiple UPFs 1435 may be deployed (e.g., in different geographical locations), and the delivery of content to UE 1401 may be coordinated via the N9 interface (e.g., as denoted in FIG. 14 by the line marked "N9" originating and terminating at UPF/PGW-U 1435). Similarly, UPF/PGW-U 1435 may receive traffic from UE 1401 (e.g., via RAN 1410, RAN 1412, SMF/PGW-C 1420, and/or one or more other devices), and may forward the traffic toward DN 1450. In some embodiments, UPF/PGW-U 1435 may communicate (e.g., via the N4 interface) with SMF/PGW-C 1420, regarding user plane data processed by UPF/PGW-U 1435.

UDM/HSS 1440 and AUSF 1445 may include one or more devices, systems, VNFs, CNFs, etc., that manage, update, and/or store, in one or more memory devices associated with AUSF 1445 and/or UDM/HSS 1440, profile information associated with a subscriber. AUSF 1445 and/or UDM/HSS 1440 may perform authentication, authorization, and/or accounting operations associated with the subscriber and/or a communication session with UE 1401.

DN 1450 may include one or more wired and/or wireless networks. For example, DN 1450 may include an Internet Protocol ("IP")-based PDN, a wide area network ("WAN") such as the Internet, a private enterprise network, and/or one or more other networks. UE 1401 may communicate, through DN 1450, with data servers, other UEs 1401, and/or to other servers or applications that are coupled to DN 1450. DN 1450 may be connected to one or more other networks, such as a public switched telephone network ("PSTN"), a public land mobile network ("PLMN"), and/or another network. DN 1450 may be connected to one or more devices, such as content providers, applications, web servers, and/or other devices, with which UE 1401 may communicate.

Figure 15:
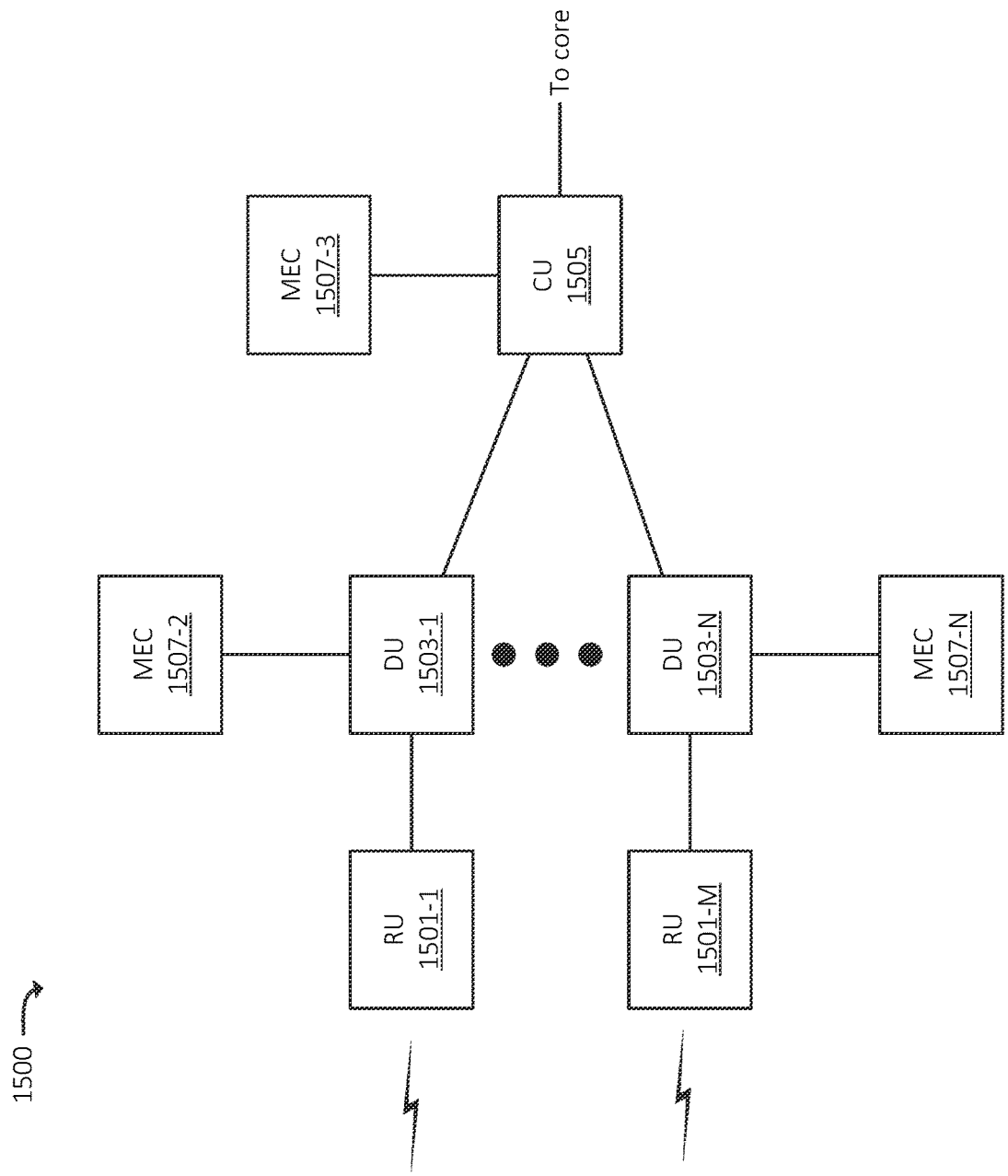
FIG. 15 illustrates an example arrangement of a radio access network ("RAN"), in accordance with some embodiments.

FIG. 15 illustrates an example RAN environment 1500, which may be included in and/or implemented by one or more RANs (e.g., RAN 1410, RAN 1412, or some other RAN). In some embodiments, a particular RAN may include one RAN environment 1500. In some embodiments, a particular RAN may include multiple RAN environments 1500. In some embodiments, RAN environment 1500 may correspond to a particular gNB 1411 of a 5G RAN (e.g., RAN 1410). In some embodiments, RAN environment 1500 may correspond to multiple gNBs 1411. In some embodiments, RAN environment 1500 may correspond to one or more other types of base stations of one or more other types of RANs. As shown, RAN environment 1500 may include Central Unit ("CU") 1505, one or more Distributed Units ("DUs") 1503-1 through 1503-N (referred to individually as "DU 1503," or collectively as "DUs 1503"), and one or more Radio Units ("RUs") 1501-1 through 1501-M (referred to individually as "RU 1501," or collectively as "RUs 1501").

CU 1505 may communicate with a core of a wireless network (e.g., may communicate with one or more of the devices or systems described above with respect to FIG. 14, such as AMF 1415 and/or UPF/PGW-U 1435). In the uplink direction (e.g., for traffic from UEs 1401 to a core network), CU 1505 may aggregate traffic from DUs 1503, and forward the aggregated traffic to the core network. In some embodiments, CU 1505 may receive traffic according to a given protocol (e.g., Radio Link Control ("RLC")) from DUs 1503, and may perform higher-layer processing (e.g., may aggregate/process RLC packets and generate Packet Data Convergence Protocol ("PDCP") packets based on the RLC packets) on the traffic received from DUs 1503.

In accordance with some embodiments, CU 1505 may receive downlink traffic (e.g., traffic from the core network) for a particular UE 1401, and may determine which DU(s) 1503 should receive the downlink traffic. DU 1503 may include one or more devices that transmit traffic between a core network (e.g., via CU 1505) and UE 1401 (e.g., via a respective RU 1501). DU 1503 may, for example, receive traffic from RU 1501 at a first layer (e.g., physical ("PHY") layer traffic, or lower PHY layer traffic), and may process/aggregate the traffic to a second layer (e.g., upper PHY and/or RLC). DU 1503 may receive traffic from CU 1505 at the second layer, may process the traffic to the first layer, and provide the processed traffic to a respective RU 1501 for transmission to UE 1401.

RU 1501 may include hardware circuitry (e.g., one or more RF transceivers, antennas, radios, and/or other suitable hardware) to communicate wirelessly (e.g., via an RF interface) with one or more UEs 1401, one or more other DUs 1503 (e.g., via RUs 1501 associated with DUs 1503), and/or any other suitable type of device. In the uplink direction, RU 1501 may receive traffic from UE 1401 and/or another DU 1503 via the RF interface and may provide the traffic to DU 1503. In the downlink direction, RU 1501 may receive traffic from DU 1503, and may provide the traffic to UE 1401 and/or another DU 1503.

One or more elements of RAN environment 1500 may, in some embodiments, be communicatively coupled to one or more Multi-Access/Mobile Edge Computing ("MEC")

devices, referred to sometimes herein simply as "MECs" 1507. For example, DU 1503-1 may be communicatively coupled to MEC 1507-1, DU 1503-N may be communicatively coupled to MEC 1507-N, CU 1505 may be communicatively coupled to MEC 1507-2, and so on. MECs 1507 may include hardware resources (e.g., configurable or provisionable hardware resources) that may be configured to provide services and/or otherwise process traffic to and/or from UE 1401, via a respective RU 1501.

For example, DU 1503-1 may route some traffic, from UE 1401, to MEC 1507-1 instead of to a core network via CU 1505. MEC 1507-1 may process the traffic, perform one or more computations based on the received traffic, and may provide traffic to UE 1401 via RU 1501-1. In some embodiments, MEC 1507 may include, and/or may implement, some or all of the functionality described above with respect to node 103, AF 1430, UPF 1435, and/or one or more other devices, systems, VNFs, CNFs, etc. In this manner, ultra-low latency services may be provided to UE 1401, as traffic does not need to traverse DU 1503, CU 1505, links between DU 1503 and CU 1505, and an intervening backhaul network between RAN environment 1500 and the core network.

Figure 16:
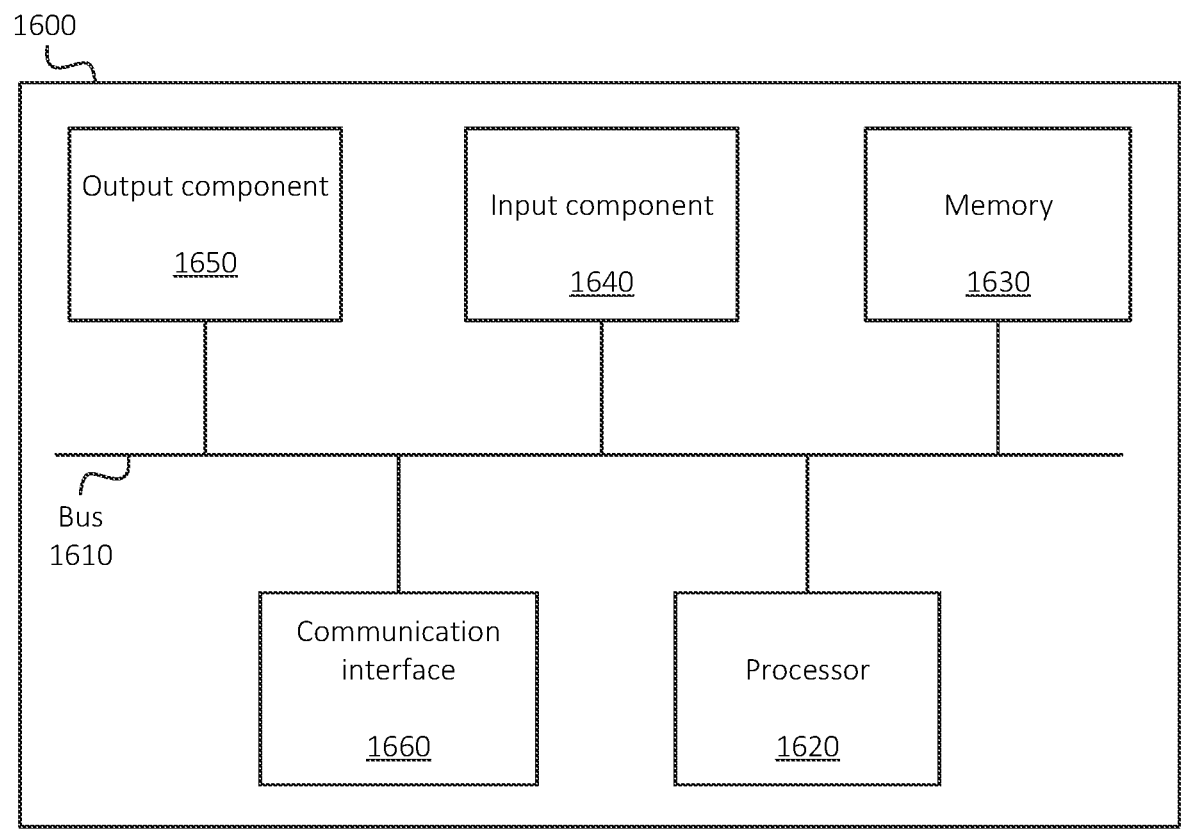
FIG. 16 illustrates example components of one or more devices, in accordance with one or more embodiments described herein.

FIG. 16 illustrates example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. In some embodiments, processor 1620 may be or may include one or more hardware processors. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600 and/or other receives or detects input from a source external to 1640, such as a touchpad, a touchscreen, a keyboard, a keypad, a button, a switch, a microphone or other audio input component, etc. In some embodiments, input component 1640 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-12B), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain a distributed ledger that is also maintained by at least one other device;
receive a record for recordation to the distributed ledger;
add the record to the distributed ledger without communicating with the at least one other device to validate the record;
receive a request for information included in the record;
after receiving the request for the information included in the record, communicate with one or more devices, of the at least one other device, to validate the record;
determine, based on communicating with the one or more devices, that the record is valid; and
output, in response to the request and based on determining that the record is valid, the requested information included in the record.

2. The device of claim 1, wherein adding the record to the distributed ledger without communicating with the at least one other device to validate the record includes committing the record to the distributed ledger without cross-validating the record.

3. The device of claim 1, wherein the one or more processors are further configured to:
maintain validation information for each record of the distributed ledger indicating whether the each record has been cross-validated in accordance with a consensus mechanism associated with the distributed ledger.

4. The device of claim 3, wherein the one or more processors are further configured to:
update, based on determining that the record is valid, the validation information to indicate that the record has been cross-validated.

5. The device of claim 1, wherein the information included in the record includes a public key associated with a private key used to encrypt a message, wherein the public key is usable to decrypt the message.

6. The device of claim 1, wherein the request is a first request, wherein the one or more processors are further configured to:
receive a second request for the information included in the record;
determine, based on receiving the second request, that the record has previously been validated by the one or more devices; and
output, in response to the second request and based on determining that the record has previously been validated by the one or more devices, the requested information included in the record.

7. The device of claim 1, wherein validating the record includes:
computing a value based on the record;
receiving the same computed value from the one or more devices; and
determining that at least a threshold quantity of devices have provided the same computed value based on the record.

8. A non-transitory computer-readable medium, storing a plurality of processor-executable instructions to:
maintain, by a device, a distributed ledger that is also maintained by at least one other device;
receive a record for recordation to the distributed ledger;
add the record to the distributed ledger without communicating with the at least one other device to validate the record;
receive a request for information included in the record;
after receiving the request for the information included in the record, communicate with one or more devices, of the at least one other device, to validate the record;
determine, based on communicating with the one or more devices, that the record is valid; and
output, in response to the request and based on determining that the record is valid, the requested information included in the record.

9. The non-transitory computer-readable medium of claim 8, wherein adding the record to the distributed ledger without communicating with the at least one other device to validate the record includes committing the record to the distributed ledger without cross-validating the record.

10. The non-transitory computer-readable medium of claim 8, wherein the plurality of processor-executable instructions further include processor-executable instructions to:
maintain validation information for each record of the distributed ledger indicating whether the each record has been cross-validated in accordance with a consensus mechanism associated with the distributed ledger.

11. The non-transitory computer-readable medium of claim 10, wherein the plurality of processor-executable instructions further include processor-executable instructions to:
update, based on determining that the record is valid, the validation information to indicate that the record has been cross-validated.

12. The non-transitory computer-readable medium of claim 8, wherein the information included in the record includes a public key associated with a private key used to encrypt a message, wherein the public key is usable to decrypt the message.

13. The non-transitory computer-readable medium of claim 8, wherein the request is a first request, wherein the plurality of processor-executable instructions further include processor-executable instructions to:
- receive a second request for the information included in the record;
- determine, based on receiving the second request, that the record has previously been validated by the one or more devices; and
- output, in response to the second request and based on determining that the record has previously been validated by the one or more devices, the requested information included in the record.

14. The non-transitory computer-readable medium of claim 8, wherein validating the record includes:
- computing a value based on the record;
- receiving the same computed value from the one or more devices; and
- determining that at least a threshold quantity of devices have provided the same computed value based on the record.

15. A method, comprising:
- maintaining, by a device, a distributed ledger that is also maintained by at least one other device;
- receiving a record for recordation to the distributed ledger;
- adding the record to the distributed ledger without communicating with the at least one other device to validate the record;
- receiving a request for information included in the record;
- after receiving the request for the information included in the record, communicating with one or more devices, of the at least one other device, to validate the record;
- determining, based on communicating with the one or more devices, that the record is valid; and
- outputting, in response to the request and based on determining that the record is valid, the requested information included in the record.

16. The method of claim 15, wherein adding the record to the distributed ledger without communicating with the at least one other device to validate the record includes committing the record to the distributed ledger without cross-validating the record.

17. The method of claim 15, further comprising:
- maintaining validation information for each record of the distributed ledger indicating whether the each record has been cross-validated in accordance with a consensus mechanism associated with the distributed ledger; and
- updating, based on determining that the record is valid, the validation information to indicate that the record has been cross-validated.

18. The method of claim 15, wherein the information included in the record includes a public key associated with a private key used to encrypt a message, wherein the public key is usable to decrypt the message.

19. The method of claim 15, wherein the request is a first request, the method further comprising:
- receiving a second request for the information included in the record;
- determining, based on receiving the second request, that the record has previously been validated by the one or more devices; and
- outputting, in response to the second request and based on determining that the record has previously been validated by the one or more devices, the requested information included in the record.

20. The method of claim 15, wherein validating the record includes:
- computing a value based on the record;
- receiving the same computed value from the one or more devices; and
- determining that at least a threshold quantity of devices have provided the same computed value based on the record.

* * * * *